(12) United States Patent
Berg et al.

(10) Patent No.: US 9,042,864 B2
(45) Date of Patent: May 26, 2015

(54) APPLIANCE IN A MOBILE DATA NETWORK THAT SPANS MULTIPLE ENCLOSURES

(75) Inventors: William F. Berg, Rochester, MN (US); Michael T. Kalmbach, Elgin, MN (US); Mark D. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/329,773

(22) Filed: Dec. 19, 2011

(65) Prior Publication Data

US 2013/0157616 A1 Jun. 20, 2013

(51) Int. Cl.
 H04L 12/24 (2006.01)
 H04W 24/02 (2009.01)
 H04W 4/00 (2009.01)

(52) U.S. Cl.
 CPC ............... H04L 41/00 (2013.01); H04L 41/06 (2013.01); H04W 4/001 (2013.01); H04W 24/02 (2013.01)

(58) Field of Classification Search
 CPC ........ H04L 41/00; H04L 41/06; H04W 24/02
 USPC .............. 455/410, 418–420, 456.5, 561, 424, 455/556.1, 575.1
 See application file for complete search history.

(56) References Cited

U.S. PATENT DOCUMENTS

| | | | |
|---|---|---|---|
| 5,287,506 A | 2/1994 | Whiteside | |
| 5,390,324 A | 2/1995 | Burckhartt et al. | |
| 5,708,776 A | 1/1998 | Kikinis | |
| 5,913,034 A * | 6/1999 | Malcolm | 709/223 |
| 6,519,461 B1 | 2/2003 | Andersson et al. | |
| 7,724,707 B2 | 5/2010 | Foster et al. | |
| 7,852,838 B2 | 12/2010 | Miller et al. | |
| 7,916,649 B2 | 3/2011 | Buvaneswari et al. | |
| 7,979,733 B2 | 7/2011 | Erdtmann et al. | |
| 8,023,491 B2 | 9/2011 | Gruber | |
| 8,254,294 B2 | 8/2012 | Vesterinen | |

(Continued)

FOREIGN PATENT DOCUMENTS

| | | |
|---|---|---|
| WO | 03041279 A2 | 5/2003 |
| WO | WO2011182351 A1 | 2/2011 |

OTHER PUBLICATIONS

Opengear Quad-Band GSM/UMTS/HSPA Cellular Appliance Gaines PTCRB Certification, Oct. 20, 2010.

(Continued)

*Primary Examiner* — Dinh P Nguyen
(74) *Attorney, Agent, or Firm* — Martin & Associates, LLC; Derek P. Martin

(57) ABSTRACT

Mobile network services are performed in an appliance in a mobile data network in a way that is transparent to most of the existing equipment in the mobile data network. The mobile data network includes a radio access network and a core network. The appliance in the radio access network breaks out data coming from a basestation, and performs one or more mobile network services at the edge of the mobile data network based on the broken out data. The appliance has defined interfaces and defined commands on each interface that allow performing all needed functions on the appliance without revealing details regarding the hardware and software used to implement the appliance. This appliance architecture allows performing new mobile network services at the edge of a mobile data network within the infrastructure of an existing mobile data network.

13 Claims, 24 Drawing Sheets

(56) References Cited

U.S. PATENT DOCUMENTS

| | | | |
|---|---|---|---|
| 8,363,665 | B2 | 1/2013 | Lim et al. |
| 8,432,871 | B1 | 4/2013 | Sarnaik et al. |
| 8,457,636 | B2 | 6/2013 | Liu et al. |
| 8,462,696 | B2 | 6/2013 | Vesterinen et al. |
| 8,462,770 | B2 | 6/2013 | Kant et al. |
| 8,477,785 | B2 | 7/2013 | Kant et al. |
| 8,493,898 | B2 | 7/2013 | Billau et al. |
| 8,503,393 | B2 | 8/2013 | Vesterinen |
| 8,520,615 | B2 | 8/2013 | Mehta et al. |
| 8,538,433 | B2 | 9/2013 | Kekki et al. |
| 8,743,690 | B1 | 6/2014 | Janarthanan et al. |
| 8,792,353 | B1 | 7/2014 | Janarthanan et al. |
| 8,792,495 | B1 | 7/2014 | Dixon et al. |
| 2002/0154646 | A1* | 10/2002 | Dubois et al. ............... 370/406 |
| 2002/0162059 | A1 | 10/2002 | McNeely et al. |
| 2004/0146027 | A1 | 7/2004 | Shinozaki et al. |
| 2005/0204390 | A1 | 9/2005 | Hofmann et al. |
| 2005/0266799 | A1 | 12/2005 | Hara et al. |
| 2006/0050680 | A1 | 3/2006 | Naim et al. |
| 2007/0127443 | A1 | 6/2007 | Spencer et al. |
| 2008/0137541 | A1 | 6/2008 | Agarwal et al. |
| 2008/0267128 | A1 | 10/2008 | Bennett et al. |
| 2008/0293413 | A1 | 11/2008 | Sharif-Ahmadi et al. |
| 2009/0122712 | A1 | 5/2009 | Sharif-Ahmadi et al. |
| 2009/0232015 | A1 | 9/2009 | Domschitz et al. |
| 2010/0027516 | A1* | 2/2010 | Nagarajan ............... 370/338 |
| 2010/0130170 | A1 | 5/2010 | Liu et al. |
| 2010/0211686 | A1 | 8/2010 | Poikselka |
| 2010/0291914 | A1 | 11/2010 | Isaksson et al. |
| 2011/0070906 | A1 | 3/2011 | Chami et al. |
| 2011/0075557 | A1* | 3/2011 | Chowdhury et al. ......... 370/230 |
| 2011/0075675 | A1 | 3/2011 | Koodli et al. |
| 2011/0103310 | A1 | 5/2011 | Stojanovski et al. |
| 2011/0176531 | A1 | 7/2011 | Rune et al. |
| 2011/0235595 | A1 | 9/2011 | Mehta et al. |
| 2011/0305138 | A1 | 12/2011 | Huomo et al. |
| 2012/0082073 | A1 | 4/2012 | Andreasen et al. |
| 2012/0082093 | A1 | 4/2012 | Andreasen et al. |
| 2012/0082094 | A1 | 4/2012 | Andreasen et al. |
| 2012/0082132 | A1 | 4/2012 | Andreasen et al. |
| 2012/0082146 | A1 | 4/2012 | Andreasen et al. |
| 2012/0188895 | A1 | 7/2012 | Punz et al. |
| 2012/0243432 | A1 | 9/2012 | Liebsch et al. |
| 2012/0244861 | A1 | 9/2012 | Agarwal et al. |
| 2012/0269162 | A1 | 10/2012 | Vesterinen et al. |
| 2013/0097674 | A1 | 4/2013 | Jindal et al. |
| 2013/0109380 | A1 | 5/2013 | Centonza et al. |

OTHER PUBLICATIONS

PSE 3G VAS Genie, www.mirial.com, Sep. 21, 2011.

UMTS/HSDPA connection with UTM-1 Edge Appliance an T-D1 SIM, http://cpshared.com/forums/showthread.php?t=153, Sep. 21, 2011.

International Search Report and Written Opinion of the ISA dated Mar. 19, 2013—International Application No. PCT/EP2012/071490.

Kundalkar et al., "LIPA: Local IP Access via Home Node B", Nov. 13, 2009.

Opengear Quad-Band GSM/UMTS/HSPA Cellular Appliance Gains PTCRB Certification, Oct. 20, 2010.

Pending U.S. Patent Application entitled "Mobile Network Services in a Mobile Data Network", U.S. Appl. No. 13/233,812, filed Sep. 15, 2011 by Bruce O. Anthony, Jr. et al.

Pending U.S. Patent Application entitled "Data Breakout Appliance at the Edge of a Mobile Data Network", U.S. Appl. No. 13/297,807, filed Nov. 16, 2011 by William F. Berg et al.

* cited by examiner

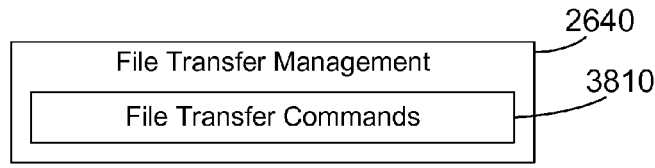

FIG. 38

| Commands | Interface |
|---|---|
| Configuration Management | CLI for all commands except file transfer commands<br>SCP for file transfer commands |
| Performance Management | CLI for all commands except file transfer commands<br>SCP for file transfer commands |
| Fault/Diagnostic Management | CLI for all commands except alarm traps and file transfer commands<br>SNMP for alarm traps<br>SCP for file transfer commands |
| Security Management | CLI for all commands except file transfer commands<br>SCP for file transfer commands |
| Network Management | CLI for all commands |
| Breakout Management | CLI for all commands |
| Appliance Platform Management | CLI for all commands except file transfer commands<br>SCP for file transfer commands |
| High Availability Management | CLI for all commands except file transfer commands<br>SCP for file transfer commands |
| Business Intelligence Management | CLI for all commands except file transfer commands<br>SCP for file transfer commands |
| Alarm Management | SNMP for all commands |
| File Transfer Management | SCP for all commands |

FIG. 39

APPLIANCE IN A MOBILE DATA NETWORK THAT SPANS MULTIPLE ENCLOSURES

BACKGROUND

1. Technical Field

This disclosure generally relates to mobile data systems, and more specifically relates to an appliance in a mobile data network that includes hardware in multiple enclosures, where the appliance performs breakout of data in a mobile data network in a way that is transparent to existing equipment in the mobile data network so one or more mobile network services may be performed in response to the broken-out data.

2. Background Art

Mobile phones have evolved into "smart phones" that allow a user not only to make a call, but also to access data, such as e-mails, the internet, etc. Mobile phone networks have evolved as well to provide the data services that new mobile devices require. For example, 3G networks cover most of the United States, and allow users high-speed wireless data access on their mobile devices. In addition, phones are not the only devices that can access mobile data networks. Many mobile phone companies provide equipment and services that allow a subscriber to plug a mobile access card into a Universal Serial Bus (USB) port on a laptop computer, and provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network. As time marches on, the amount of data served on mobile data networks will continue to rise exponentially.

Mobile data networks include very expensive hardware and software, so upgrading the capability of existing networks is not an easy thing to do. It is not economically feasible for a mobile network provider to simply replace all older equipment with new equipment due to the expense of replacing the equipment. For example, the next generation wireless network in the United States is the 4G network. Many mobile data network providers are still struggling to get their entire system upgraded to provide 3G data services. Immediately upgrading to 4G equipment is not an economically viable option for most mobile data network providers. In many locations, portions of the mobile data network are connected together by point to point microwave links. These microwave links have limited bandwidth. To significantly boost the throughput of this links requires the microwave links to be replaced with fiber optic cable but this option is very costly.

BRIEF SUMMARY

Mobile network services are performed in an appliance in a mobile data network in a way that is transparent to most of the existing equipment in the mobile data network. The mobile data network includes a radio access network and a core network. The appliance is defined to include hardware in multiple enclosures. The appliance has defined interfaces and defined commands on each interface that allow performing all needed functions on the appliance without revealing details regarding the hardware and software used to implement the appliance. This appliance architecture allows performing new mobile network services in a mobile data network within the infrastructure of an existing mobile data network.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 38 is a block diagram of one specific implementation for the file transfer management 2640 shown in FIG. 26; and FIG. 39 is a table showing which commands are defined for the appliance interfaces.

DETAILED DESCRIPTION

The claims and disclosure herein provide mechanisms and methods for performing mobile network services in an appliance in the mobile data network within the existing infrastructure of the mobile data network. The appliance is defined to include hardware in multiple enclosures, and provides interfaces and commands that effectively hide the specific hardware and software implementation of the appliance.

Figure 1:
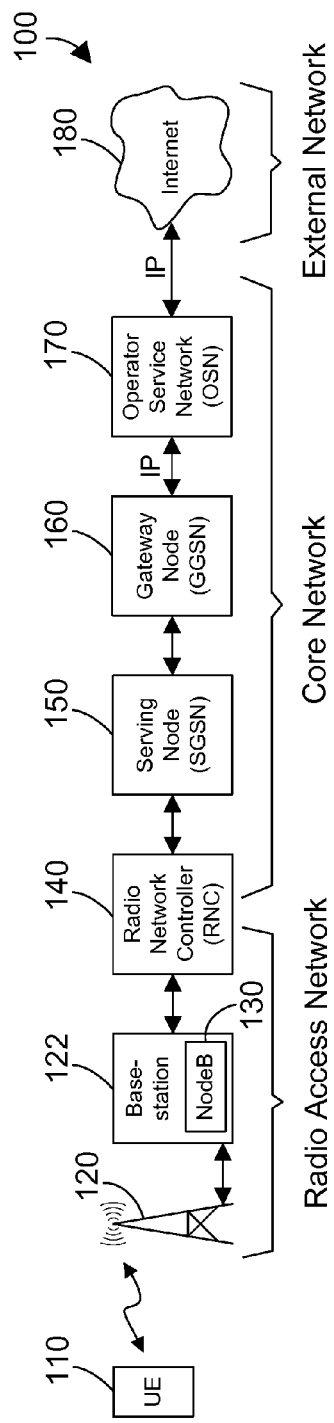
FIG. 1 is a block diagram of a prior art mobile data network.

Referring to FIG. 1, a prior art mobile data network 100 is shown. Mobile data network 100 is representative of known 3G networks. The mobile data network 100 preferably includes a radio access network (RAN), a core network, and an external network, as shown in FIG. 1. The radio access network includes the tower 120, basestation 122 with its corresponding NodeB 130, and a radio interface on a radio network controller (RNC) 140. The core network includes a network interface on the radio network controller 140, the serving node 150, gateway node 160 and operator service network 170 (as part of the mobile data network). The external network includes any suitable network. One suitable example for an external network is the internet 180, as shown in the specific example in FIG. 1.

In mobile data network 100, user equipment 110 communicates via radio waves to a tower 120. User equipment 110 may include any device capable of connecting to a mobile data network, including a mobile phone, a tablet computer, a mobile access card coupled to a laptop computer, etc. The tower 120 communicates via network connection to a basestation 122. Each basestation 122 includes a NodeB 130, which communicates with the tower 120 and the radio network controller 140. Note there is a fan-out that is not represented in FIG. 1. Typically there are tens of thousands of towers 120. Each tower 120 typically has a corresponding base station 122 with a NodeB 130 that communicates with the tower. However, network communications with the tens of thousands of base stations 130 are performed by hundreds of radio network controllers 140. Thus, each radio network controller 140 can service many NodeBs 130 in basestations 122. There may also be other items in the network between the basestation 130 and the radio network controller 140 that are not shown in FIG. 1, such as concentrators (points of concentration) or RAN aggregators that support communications with many basestations.

The radio network controller 140 communicates with the serving node 150. In a typical 3G network, the serving node 150 is an SGSN, which is short for Service GPRS Support Node, where GPRS stands for general packet radio service. The serving node 150 mediates access to network resources on behalf of mobile subscribers and implements the packet scheduling policy between different classes of quality of service. It is also responsible for establishing the Packet Data Protocol (PDP) context with the gateway node 160 for a given subscriber session. The serving node 150 is responsible for the delivery of data packets from and to the basestations within its geographical service area. The tasks of the serving node 150 include packet routing and transfer, mobility management (attach/detach and location management), logical link management, and authentication and charging functions. The serving node 150 stores location information and user profiles of all subscribers registered with the serving node 150. Functions the serving node 150 typically performs include GPRS tunneling protocol (GTP) tunneling of packets, performing mobility management as user equipment moves from one basestation to the next, and billing user data.

In a typical 3G network, the gateway node 160 is a GGSN, which is short for gateway GPRS support node. The gateway node 160 is responsible for the interworking between the core network and external networks. From the viewpoint of the external networks 180, gateway node 160 is a router to a sub-network, because the gateway node 160 "hides" the core network infrastructure from the external network. When the gateway node 160 receives data from an external network (such as internet 180) addressed to a specific subscriber, it forwards the data to the serving node 150 serving the subscriber. For inactive subscribers paging is initiated. The gateway node 160 also handles routing packets originated from the user equipment 110 to the appropriate external network. As anchor point the gateway node 160 supports the mobility of the user equipment 110. In essence, the gateway node 160 maintains routing necessary to tunnel the network packets to the serving node 150 that services a particular user equipment 110.

The gateway node 160 converts the packets coming from the serving node 150 into the appropriate packet data protocol (PDP) format (e.g., IP or X.25) and sends them out on the corresponding external network. In the other direction, PDP addresses of incoming data packets from the external network 180 are converted to the address of the subscriber's user equipment 110. The readdressed packets are sent to the responsible serving node 150. For this purpose, the gateway node 160 stores the current serving node address of the subscriber and his or her profile. The gateway node 160 is responsible for IP address assignment and is the default router for the subscriber's user equipment 110. The gateway node 160 also performs authentication, charging and subscriber policy functions. One example of a subscriber policy function is "fair use" bandwidth limiting and blocking of particular traffic types such as peer to peer traffic. Another example of a subscriber policy function is degradation to a 2G service level for a prepaid subscriber when the prepaid balance is zero.

A next hop router located in the operator service network (OSN) 170 receives messages from the gateway node 160, and routes the traffic either to the operator service network 170 or via an internet service provider (ISP) towards the internet 180. The operator service network 170 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110 to tower 120, to NodeB 130 in basestation 122, to radio network controller 140, to serving node 150, to gateway node 160, to operator service network 170, and to internet 180. When the requested data is delivered, the data traverses the entire network from the internet 180 to the user equipment 110. The capabilities of known mobile data networks 100 are taxed by the ever-increasing volume of data being exchanged between user equipment 110 and the internet 180 because all data between the two have to traverse the entire network.

Some efforts have been made to offload internet traffic to reduce the backhaul on the mobile data network. For example, some mobile data networks include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network.

Figure 2:
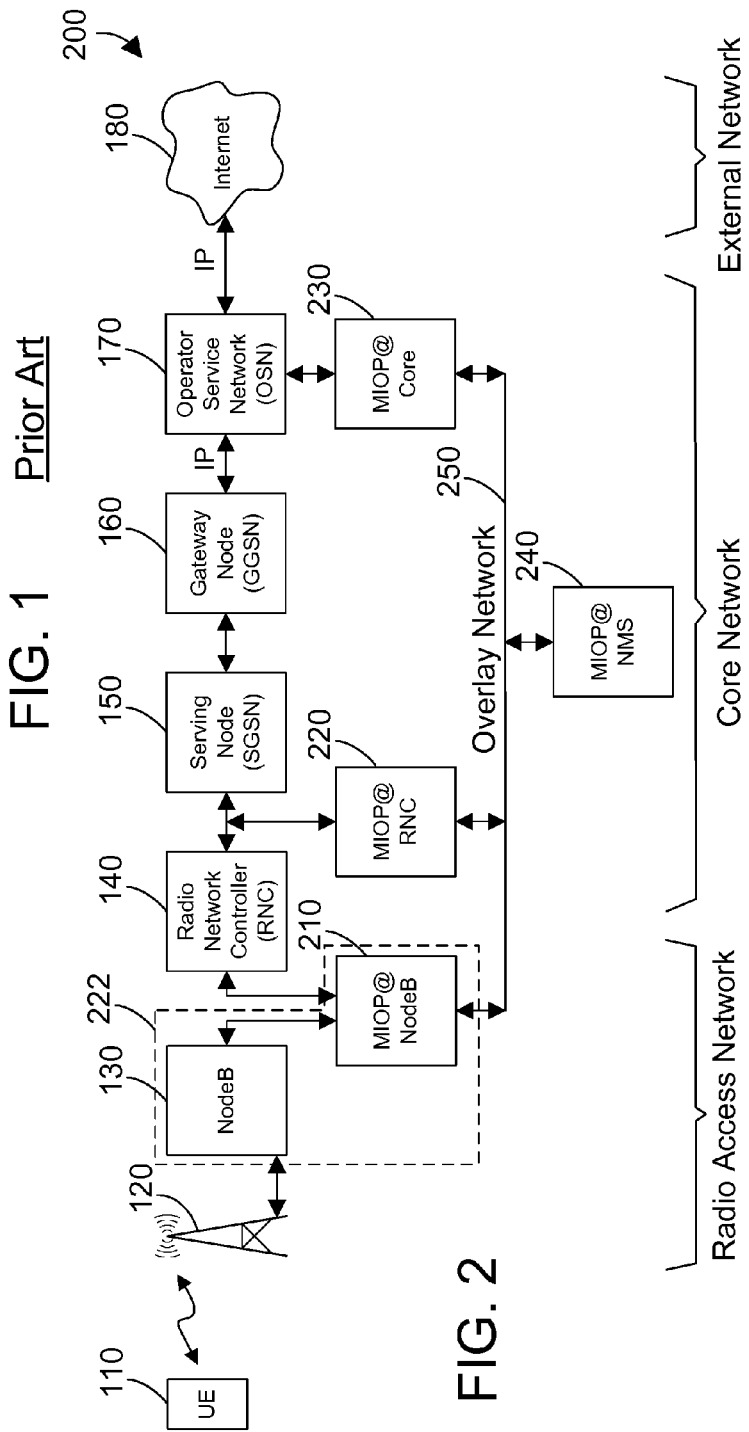
FIG. 2 is a block diagram of a mobile data network that includes first, second and third service mechanisms that all communicate via an overlay network.

Referring to FIG. 2, a mobile data network 200 includes mechanisms that provide various services for the mobile data network in a way that is transparent to most of the existing equipment in the mobile data network. FIG. 2 shows user equipment 110, tower 120, NodeB 130, radio network controller 140, serving node 150, gateway node 160, operator service node 170, and internet 180, the same as shown in FIG. 1. The additions to the mobile data network 200 when compared with the prior art mobile data network 100 in FIG. 1 include the addition of three components that may provide mobile network services in the mobile data network, along with a network management mechanism to manage the three components. The mobile network services are performed by what is called herein a Mobile Internet Optimization Platform (MIOP), and the mobile network services performed by the Mobile Internet Optimization Platform are referred to herein as MIOP services. The three MIOP components that provide these mobile network services are shown in FIG. 2 as MIOP@NodeB 210, MIOP@RNC 220 and MIOP@Core 230. A network management system shown as MIOP@NMS 240 manages the overall solution by: 1) managing the function of the three MIOP components 210, 220 and 230; 2) determining which MIOP@NodeBs in the system aggregate to which MIOP@RNCs via the overlay network for performance, fault and configuration management; and 3) monitoring performance of the MIOP@NodeBs to dynamically change and configure the mobile network services. The MIOP@NodeB 210, MIOP@RNC 220, MIOP@Core 230, MIOP@NMS 240, and the overlay network 250, and any subset of these, and are referred to herein as MIOP components.

The mobile network services provided by MIOP@NodeB 210, MIOP@RNC 220, and MIOP@Core 230 include any suitable services on the mobile data network, such as data optimizations, RAN-aware services, subscriber-aware services, edge-based application serving, edge-based analytics, etc. All mobile network services performed by all of MIOP@NodeB 210, MIOP@RNC 220, and MIOP@Core 230 are included in the term MIOP services as used herein. In addition to the services being offered in the MIOP components MIOP@NodeB 210, MIOP@RNC 220, and MIOP@Core 230, the various MIOP services could also be provided in a cloud based manner.

MIOP@NodeB 210 includes a first service mechanism and is referred to as the "edge" based portion of the MIOP solution. MIOP@NodeB 210 resides in the radio access network and has the ability to intercept all traffic to and from the NodeB 130. MIOP@NodeB 210 preferably resides in the base station 222 shown by the dotted box in FIG. 2. Thus, all data to and from the NodeB 130 to and from the radio network controller 140 is routed through MIOP@NodeB 210. MIOP@NodeB performs what is referred to herein as breakout of data on the intercepted data stream. MIOP@NodeB monitors the signaling traffic between NodeB and RNC and on connection setup intercepts in particular the setup of the transport layer (allocation of the UDP Port, IP address or AAL2 channel). For registered sessions the breakout mechanism 410 will be configured in a way that all traffic belonging to this UDP Port, IP address to AAL2 channel will be forwarded to an data offload function. MIOP@NodeB 210 thus performs breakout of data by defining a previously-existing path in the radio access network for non-broken out data, by defining a new second data path that did not previously exist in the radio access network for broken out data, identifying data received from a corresponding NodeB as data to be broken out, sending the data to be broken out on the second data path, and forwarding other data that is not broken out on the first data path. The signaling received by MIOP@NodeB 210 from NodeB 130 is forwarded to RNC 140 on the existing network connection to RNC 140, even though the data traffic is broken out. Thus, RNC 140 sees the signaling traffic and knows the subscriber session is active, but does not see the user data that is broken out by MIOP@NodeB 210. MIOP@NodeB thus performs two distinct functions depending on the monitored data packets: 1) forward the data packets to RNC 140 for signaling traffic and user data that is not broken out (including voice calls); and 2) re-route the data packets for user data that is broken out.

Once MIOP@NodeB 210 breaks out user data it can perform any suitable service based on the traffic type of the broken out data. Because the services performed by MIOP@NodeB 210 are performed in the radio access network (e.g., at the basestation 222), the MIOP@NodeB 210 can service the user equipment 110 much more quickly than can the radio network controller 140. In addition, by having a MIOP@NodeB 210 that is dedicated to a particular NodeB 130, one MIOP@NodeB only needs to service those subscribers that are currently connected via a single NodeB. The radio network controller, in contrast, which typically services dozens or even hundreds of basestations, must service all the subscribers accessing all basestations it controls from a remote location. As a result, MIOP@NodeB is in a much better position to provide services that will improve the quality of service and experience for subscribers than is the radio network controller.

Breaking out data in the radio access network by MIOP@NodeB 210 allows for many different types of services to be performed in the radio access network. These services may include optimizations that are similar to optimizations provided by known industry solutions between radio network controllers and the serving node. However, moving these optimizations to the edge of the mobile data network will not only greatly improve the quality of service for subscribers, but will also provide a foundation for applying new types of services at the edge of the mobile data network, such as terminating machine-to-machine (MTM) traffic at the edge (e.g., in the basestation), hosting applications at the edge, and performing analytics at the edge.

MIOP@RNC 220 includes a second service mechanism in mobile data network 200. MIOP@RNC 220 monitors all communication between the radio network controller 140 and serving node 150. The monitored communications are all communications to and from the radio network controller and the rest of the core network. MIOP@RNC 220 may provide one or more services for the mobile data network. MIOP@RNC 220 preferably makes the decision of whether or not to allow breakout of data. If MIOP@RNC 220 decides to breakout data for a given subscriber session, it may send a message to MIOP@NodeB 210 authorizing breakout by MIOP@NodeB 210, or may decide to breakout the data at MIOP@RNC 220, depending on the configured breakout decision criteria and selected radio channel. Because messages to and from the core network establishing the PDP context for a given subscriber session are monitored by MIOP@RNC 220, the decision of whether or not to breakout data resides in the MIOP@RNC 220.

MIOP@Core 230 includes a third service mechanism in the mobile data network 200. MIOP@Core 230 may include all the same services as MIOP@RNC 220, or any suitable subset of those services. If the decision is made not to provide services at MIOP@NodeB 210 or MIOP@RNC 220, these same services plus more sophisticated services can be performed at MIOP@Core 230. Thus, mobile data network 200 provides flexibility by allowing a decision to be made of where to perform which services. Because MIOP@NodeB 210, MIOP@RNC 220 and MIOP@Core 230 preferably include some of the same services, the services between components may interact (e.g., MIOP@NodeB and MIOP@Core may interact to optimize TCP traffic between them), or the services may be distributed across the mobile data network (e.g., MIOP@NodeB performs breakout and provides services for high-speed traffic, MIOP@RNC performs breakout and provides services for low-speed traffic, and MIOP@Core provides services for non-broken out traffic). The MIOP system architecture thus provides a very powerful and flexible solution, allowing dynamic configuring and reconfiguring on the fly of which services are performed by the MIOP components and where. In addition, these services may be implemented taking advantage of existing infrastructure in a mobile data network.

MIOP@NMS 240 is a network management system that monitors and controls the functions of MIOP@NodeB 210, MIOP@RNC 220, and MIOP@Core 230. MIOP@NMS 240 preferably includes MIOP internal real-time or near real-time performance data monitoring to determine if historical or additional regional dynamic changes are needed to improve services on the mobile data network 200. MIOP@NMS 240 provides a user interface that allows a system administrator to operate and to configure how the MIOP components 210, 220 and 230 function.

The overlay network 250 allows MIOP@NodeB 210, MIOP@RNC 220, MIOP@Core 230, and MIOP@NMS 240 to communicate with each other. The overlay network 250 is preferably a virtual private network primarily on an existing physical network in the mobile data network. Thus, while overlay network 250 is shown in FIG. 2 separate from other physical network connections, this representation in FIG. 2 is a logical representation.

Figure 3:
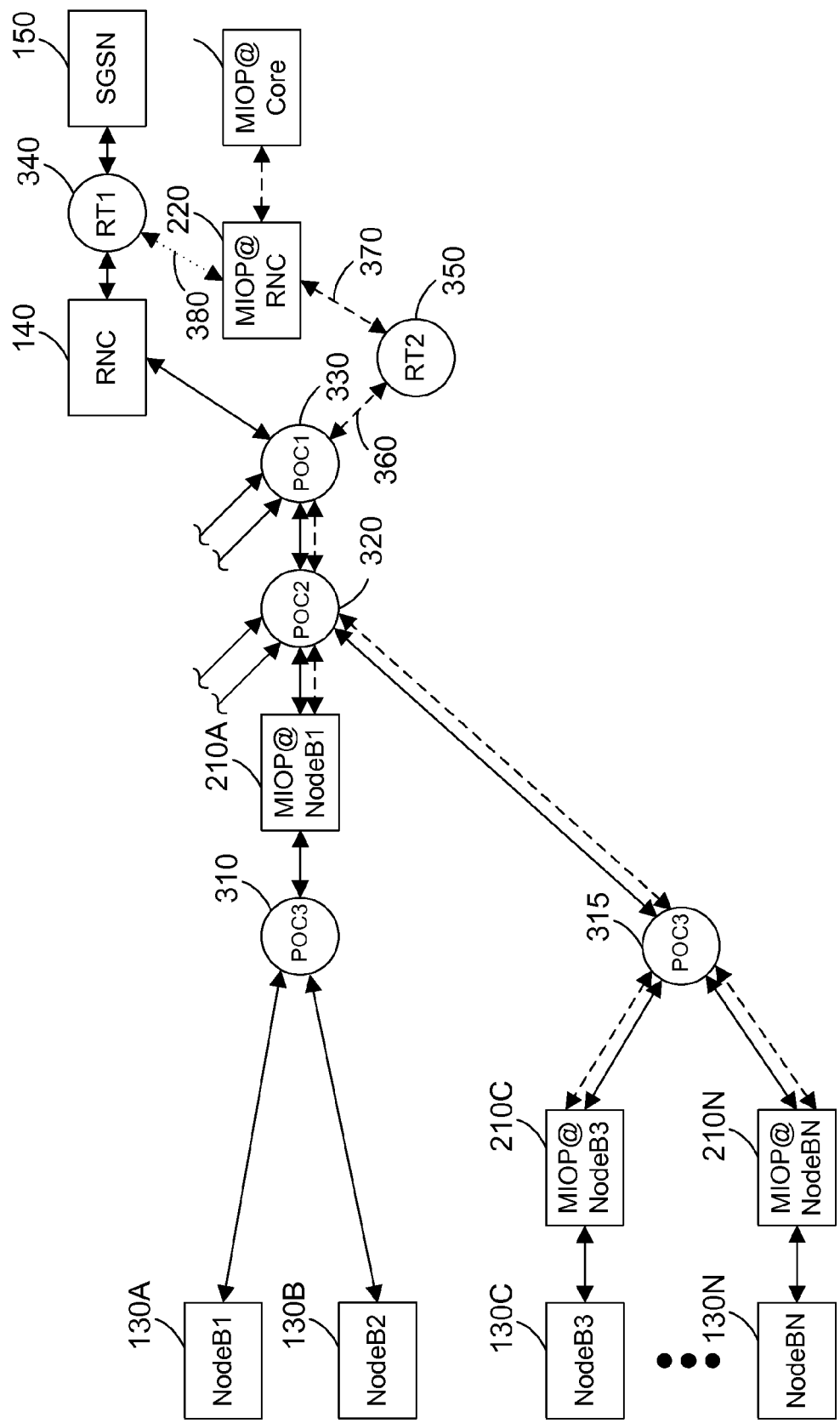
FIG. 3 is a block diagram of one possible implementation for parts of the mobile data network shown in FIG. 2 to illustrate the overlay network.

FIG. 3 shows one suitable implementation of a physical network and the overlay network in a sample mobile data system. The existing physical network in the mobile data network before the addition of the MIOP@NodeB 210, MIOP@RNC 220, and MIOP@Core 230 is shown by the solid lines with arrows. This specific example in FIG. 3 includes many NodeBs, shown in FIG. 1 as 130A, 130B, 130C, . . . , 130N. Some of the NodeBs have a corresponding MIOP@NodeB. FIG. 3 illustrates that MIOP@NodeBs (such as 210A and 210N) can be placed in a basestation with its corresponding NodeB, or can be placed upstream in the network after a point of concentration (such as 210A after POC3 310). FIG. 3 also illustrates that a single MIOP@NodeB such as MIOP@NodeB1 210A can service two different NodeBs, such as NodeB1 130A and NodeB2 130B. Part of the overlay network is shown by the dotted lines between MIOP@NodeB1 210A and second point of concentration POC2 320, between MIOP@NodeB3 210C and POC3 315, between MIOP@NodeBN 210N and POC3 315, and between POC3 315 and POC2 320. Note the overlay network in the radio access network portion is a virtual private network that is implemented on the existing physical network connections. The overlay network allows the MIOP@NodeBs 210A, 210C and 210N to communicate with each other directly, which makes some services possible in the mobile data network 200 that were previously impossible. FIG. 3 shows MIOP@NodeB1 210A connected to a second point of concentration POC2 320. The broken arrows coming in from above at POC2 320 represent connections to other NodeBs, and could also include connections to other MIOP@NodeBs. Similarly, POC2 320 is connected to a third point of concentration POC1 330, with possibly other NodeBs or MIOP@NodeBs connected to POC1. The RNC 140 is shown connected to POC1 330, and to a first router RT1 340 in the core network. The router RT1 340 is also connected to the SGSN 150. While not shown in FIG. 3 for the sake of simplicity, it is understood that SGSN in FIG. 3 is also connected to the upstream core components shown in FIG. 2, including GGSN 160, OSN 170 and internet 180.

As shown in FIG. 3, the overlay network from the NodeBs to POC1 330 is a virtual private network implemented on existing physical network connections. However, the overlay network requires a second router RT2 350, which is connected via a physical network connection 360 to POC1 330, and is connected via physical network connection 370 to MIOP@RNC 220. This second router RT2 350 may be a separate router, or may be a router implemented within MIOP@RNC 220. MIOP@RNC 220 is also connected to router RT1 340 via a physical network connection 380, and is also connected to MIOP@Core 230. Physical connection 380 in FIG. 3 is shown in a line with short dots because it is not part of the pre-existing physical network before adding the MIOP components (arrows with solid lines) and is not part of the overlay network (arrows with long dots). Note the connection from MIOP@RNC 220 to MIOP@Core 230 is via existing physical networks in the core network.

We can see from the configuration of the physical network and overlay network in FIG. 3 that minimal changes are needed to the existing mobile data network to install the MIOP components. The most that must be added is one new router 350 and three new physical network connections 360, 370 and 380. Once the new router 350 and new physical network connections 360, 370 and 380 are installed, the router 350 and MIOP components are appropriately configured, and the existing equipment in the mobile data network is configured to support the overlay network, the operation of the MIOP components is completely transparent to existing network equipment.

As can be seen in FIG. 3, data on the overlay network is defined on existing physical networks from the NodeBs to POC1. From POC1 the overlay network is on connection 360 to RT2 350, and on connection 370 to MIOP@RNC 220. Thus, when MIOP@NodeB 210 in FIG. 2 needs to send a message to MIOP@RNC 220, the message is sent by sending packets via a virtual private network on the physical network connections to POC1, then to RT2 350, then to MIOP@RNC 220. Virtual private networks are well-known in the art, so they are not discussed in more detail here.

Figure 4:
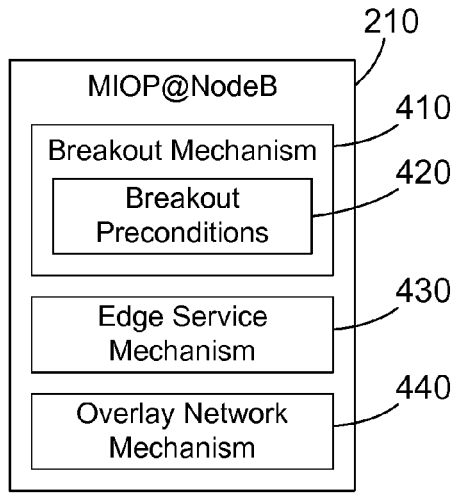
FIG. 4 is a block diagram of the MIOP@NodeB shown in FIG. 2, which includes a first service mechanism.

Referring to FIG. 4, MIOP@NodeB 210 preferably includes a breakout mechanism 410, an edge service mechanism 430, and an overlay network mechanism 440. The breakout mechanism 410 determines breakout preconditions 420 that, when satisfied, allow breakout to occur at this edge location. Breakout mechanism 410 in MIOP@NodeB 210 communicates with the breakout mechanism 510 in MIOP@RNC 220 shown in FIG. 5 to reach a breakout decision. The breakout mechanism 410, after receiving a message from MIOP@RNC 220 authorizing breakout on connection setup intercepts in particular the setup of the transport layer (allocation of the UDP Port, IP address or AAL2 channel). For authorized sessions the breakout mechanism 410 will be configured in a way that all traffic belonging to this UDP Port, IP address to AAL2 channel will be forwarded to a data offload function. For traffic that should not be broken out, the breakout mechanism 410 sends the data on the original data path in the radio access network. In essence, MIOP@NodeB 210 intercepts all communications to and from the basestation 130, and can perform services "at the edge", meaning at the edge of the radio access network that is close to the user equipment 110. By performing services at the edge, the services to subscribers may be increased or optimizes without requiring hardware changes to existing equipment in the mobile data network.

The breakout mechanism 410 preferably includes breakout preconditions 420 that specify one or more criterion that must be satisfied before breakout of data is allowed. One suitable example of breakout preconditions is the speed of the channel. In one possible implementation, only high-speed channels will be broken out at MIOP@NodeB 210. Thus, breakout preconditions 420 could specify that subscribers on high-speed channels may be broken out, while subscribers on low-speed channels are not broken out at MIOP@NodeB 210. When the breakout preconditions 420 are satisfied, the MIOP@NodeB 210 registers the subscriber session with MIOP@RNC 220. This is shown in method 800 in FIG. 8. MIOP@NodeB 210 intercepts and monitors network traffic to and from NodeB (basestation) (step 810). When the traffic does not satisfy the breakout preconditions (step 820=NO), method 800 returns to step 810. When the traffic satisfies the breakout conditions (step 820=YES), MIOP@NodeB 210 sends a message to MIOP@RNC 220 on the overlay network 250 to register the subscriber session for breakout (step 830). With the subscriber session registered with MIOP@RNC 220, the MIOP@RNC 220 will determine whether or not to breakout data for the subscriber session, and where the breakout is done, as explained in more detail below.

Referring back to FIG. 4, MIOP@NodeB 210 also includes an edge service mechanism 430. The edge service mechanism 430 provides one or more services for the mobile data network 200. The edge service mechanism 430 may include any suitable service for the mobile data network including without limitation caching of data, data or video compression techniques, push-based services, charging, application serving, analytics, security, data filtering, new revenue-producing services, etc. The edge service mechanism is the first of three service mechanisms in the MIOP components. While the breakout mechanism 410 and edge service mechanism 430 are shown as separate entities in FIG. 4, the first service mechanism could include both breakout mechanism 410 and edge service mechanism 430.

MIOP@NodeB 210 also includes an overlay network mechanism 440. The overlay network mechanism 440 provides a connection to the overlay network 250 in FIG. 2, thereby allowing MIOP@NodeB 210 to communicate with MIOP@RNC 220, MIOP@Core 230, and MIOP@NMS 240. As stated above, the overlay network 250 is preferably a virtual private network primarily on an existing physical network in the mobile data network 200.

Figure 5:
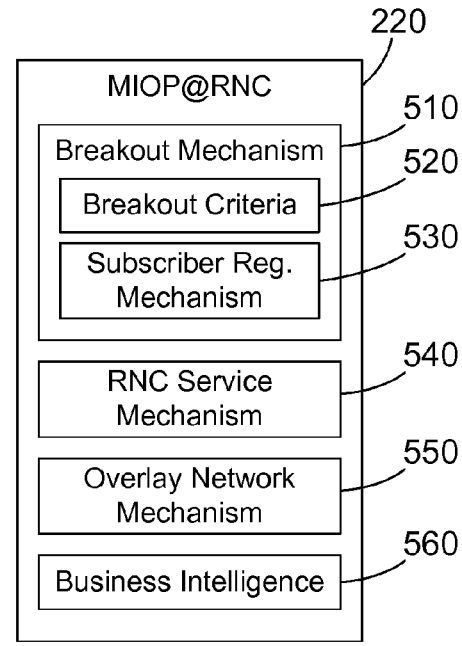
FIG. 5 is a block diagram of the MIOP@RNC shown in FIG. 2, which includes a second service mechanism.
Figure 8:
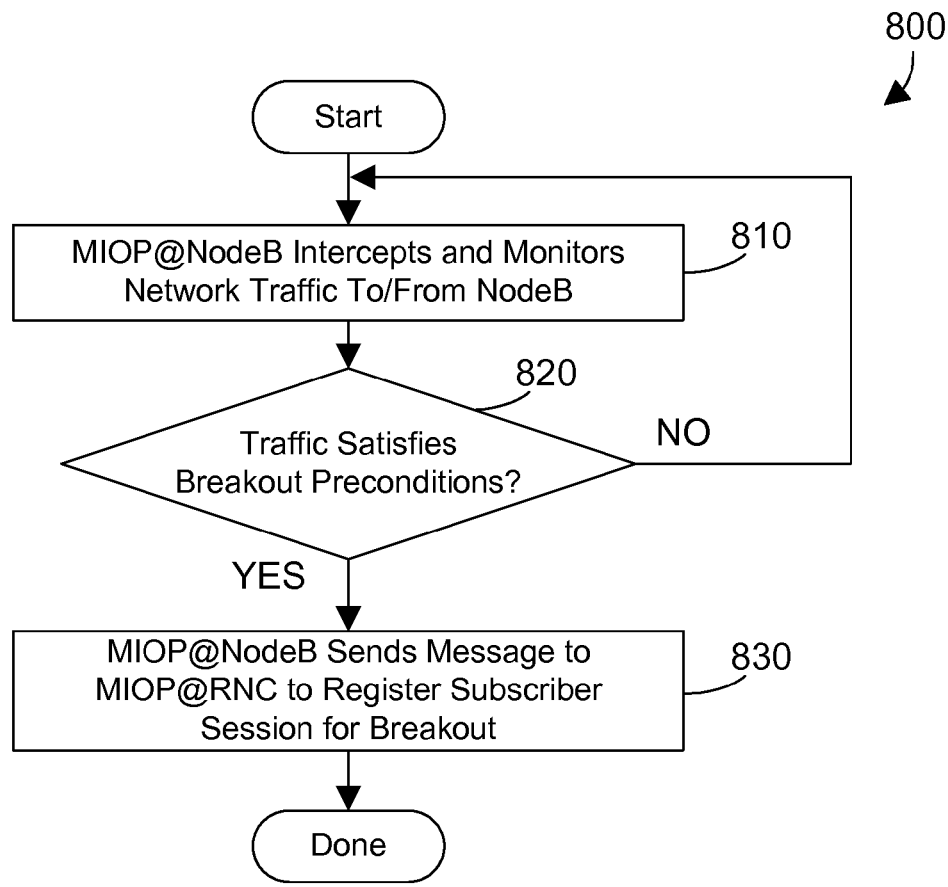
FIG. 8 is a flow diagram of a method performed by MIOP@NodeB shown in FIGS. 2 and 4.

Referring to FIG. 5, MIOP@RNC 220 preferably includes a breakout mechanism 510, an RNC service mechanism 540, an overlay network mechanism 550, and business intelligence 560. Breakout mechanism 510 includes breakout criteria 520 that specifies one or more criterion that, when satisfied, allows breakout of data. Subscriber registration mechanism 530 receives messages from MIOP@NodeB 210, and registers subscriber sessions for which the breakout preconditions 420 in MIOP@NodeB 210 are satisfied. When the breakout mechanism 510 determines the breakout criteria 520 is satisfied, the breakout mechanism 510 will then determine where the breakout should occur. When the breakout can occur at MIOP@NodeB 210, the MIOP@RNC 220 sends a message to MIOP@NodeB 210 on the overlay network 250 authorizing breakout at MIOP@NodeB 210. When the breakout should occur at MIOP@RNC 220, the breakout mechanism 510 in MIOP@RNC 220 performs the breakout as well for the traffic remaining then). This is shown in more detail in method 1000 in FIG. 10. MIOP@RNC monitors network traffic between the radio network controller 140 and the serving node 150 (step 1010). When the traffic does not satisfy the breakout criteria (step 1020=NO), method 1000 loops back to step 1010. When the network traffic satisfies the breakout criteria (step 1020=YES), the breakout mechanism 510 determines whether the subscriber session is registered for breakout (step 1030). A subscriber session is registered for breakout when the MIOP@NodeB 210 determined the traffic satisfied the breakout preconditions and registered the subscriber session for breakout, as shown in FIG. 8. Returning to FIG. 10, when the subscriber is registered for breakout (step 1030=YES), MIOP@RNC 220 sends a message via the overlay network 250 to MIOP@NodeB 210 authorizing breakout of traffic for the subscriber session (step 1040). MIOP@NodeB 210 may then breakout traffic for the subscriber session (step 1050). When the subscriber is not registered for breakout (step 1030=NO), method 1000 checks to see if MIOP@RNC is going to do breakout (step 1060). If not (step 1060=NO), method 1000 is done. When MIOP@RNC is going to do breakout (step 1060=YES), the traffic is then broken out at MIOP@RNC (step 1070).

Figure 10:
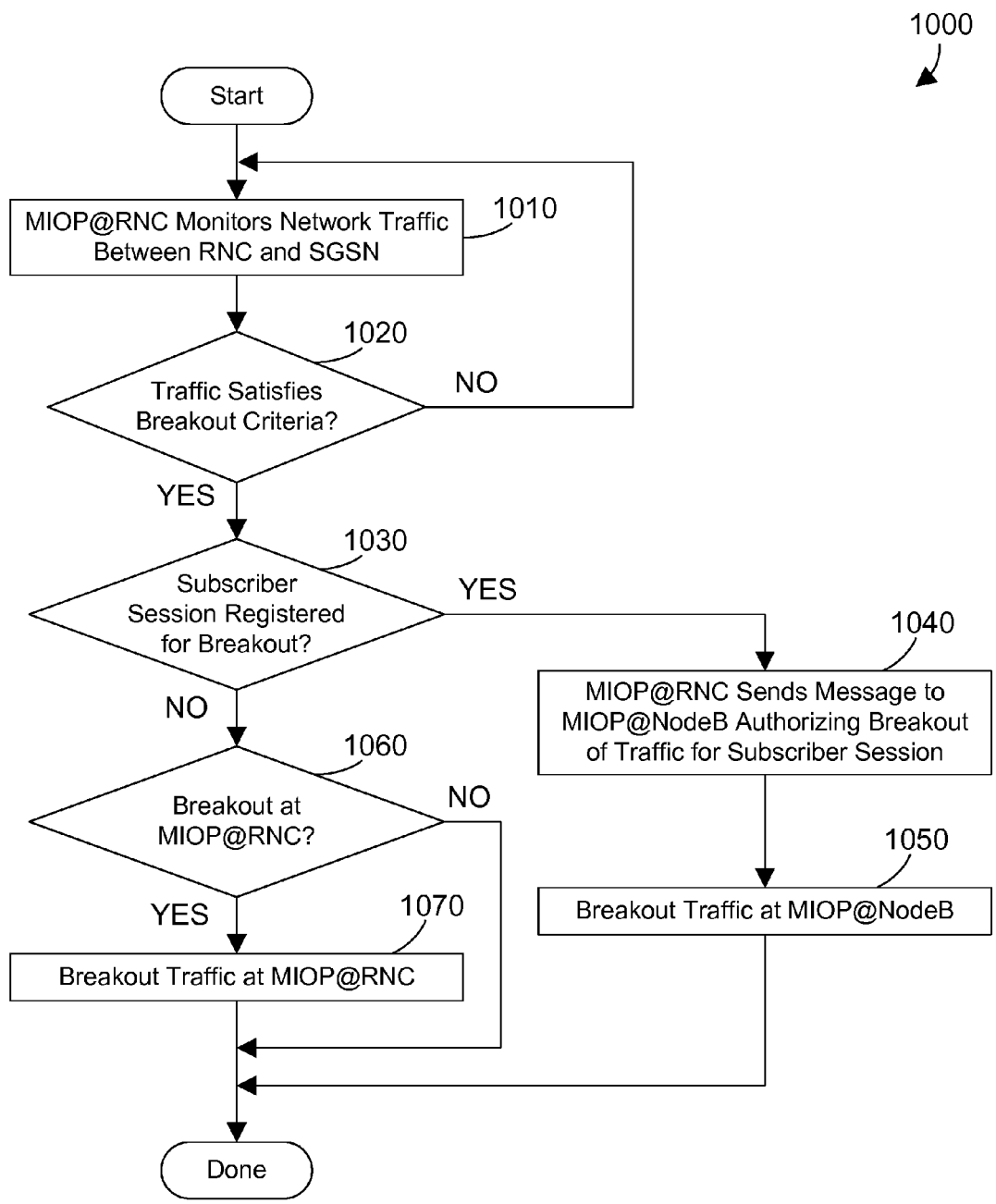
FIG. 10 is a flow diagram of a method for the MIOP@NodeB and MIOP@RNC to determine when to break out data.

In one specific example, the breakout preconditions specify only high-speed channels are broken out at MIOP@NodeB 210, and when the breakout preconditions are satisfied, the subscriber session is registered for breakout, as shown in FIG. 8. FIG. 10 illustrates that even when the breakout preconditions are not satisfied, breakout can still be performed at MIOP@RNC 220. Thus, even if the subscriber session is on a low-speed channel, if all the other breakout criteria are satisfied, breakout of the low-speed channel may be performed at MIOP@RNC 220. The mobile data network 200 thus provides great flexibility in determining when to do breakout and where.

Referring back to FIG. 5, the RNC service mechanism 540 provides one or more services for the mobile data network. RNC service mechanism 540 is the second of three service mechanisms in the MIOP components. The RNC service mechanism 540 may include any suitable service for the mobile data network, including without limitation caching of data, data or video compression techniques, push-based services, charging, application serving, analytics, security, data filtering, new revenue-producing services, etc.

While the breakout mechanism 510 and RNC service mechanism 540 are shown as separate entities in FIG. 5, the second service mechanism could include both breakout mechanism 510 and RNC service mechanism 540. The overlay network mechanism 550 is similar to the overlay network mechanism 440 in FIG. 4, providing a logical network connection to the other MIOP components on the overlay network 250 in FIG. 2. MIOP@RNC 220 also includes business intelligence 560, which includes:

1) historical subscriber information received from the mobile data network over time, such as mobility and location, volumes, traffic types, equipment used, etc.
2) network awareness, including NodeB load states, service area code, channel type, number of times channel type switching occurred for a PDP session, serving cell ID, how many cells and their IDs are in the active set, PDP context type, PDP sessions per subscriber, session duration, data consumption, list of Uniform Resource Locators (URLs) browsed for user classification, top URL browsed, first time or repeat user, entry point/referral URLs for a given site, session tracking, etc.
3) association of flow control procedures between NodeB and RNC to subscribers.

The business intelligence 560 may be instrumented by the RNC service mechanism 540 to determine when and what types of MIOP services to perform for a given subscriber. For example, services for a subscriber on a mobile phone may differ when compared to services for a subscriber using a laptop computer to access the mobile data network. In another example, voice over internet protocol (VOIP) session could have the data broken out.

Figure 6:
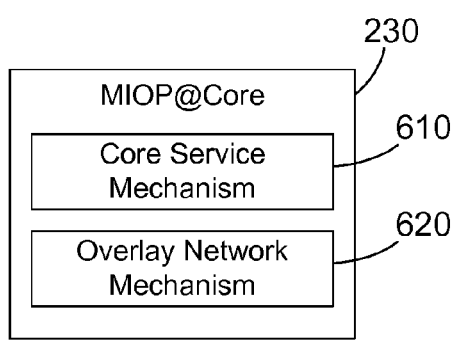
FIG. 6 is a block diagram of the MIOP@Core shown in FIG. 2, which includes a third service mechanism.

Referring to FIG. 6, the MIOP@Core 230 includes a core service mechanism 610 and an overlay network mechanism 620. Core service mechanism 610 provides one or more services for the mobile data network. Core service mechanism 610 is the third of three service mechanisms in the MIOP components. The core service mechanism 610 may include any suitable service for the mobile data network, including without limitation caching of data, data or video compression techniques, push-based services, charging, application serving, analytics, security, data filtering, new revenue-producing services, etc. In one specific implementation, the MIOP@Core 230 is an optional component, because all needed services could be performed at MIOP@NodeB 210 and MIOP@RNC 220. In an alternative implementation, MIOP@Core 230 performs some services, while MIOP@RNC performs others or none. The overlay network mechanism 620 is similar to the overlay network mechanisms 440 in FIGS. 4 and 550 in FIG. 5, providing a logical network connection to the other MIOP components on the overlay network 250 in FIG. 2.

Figure 7:
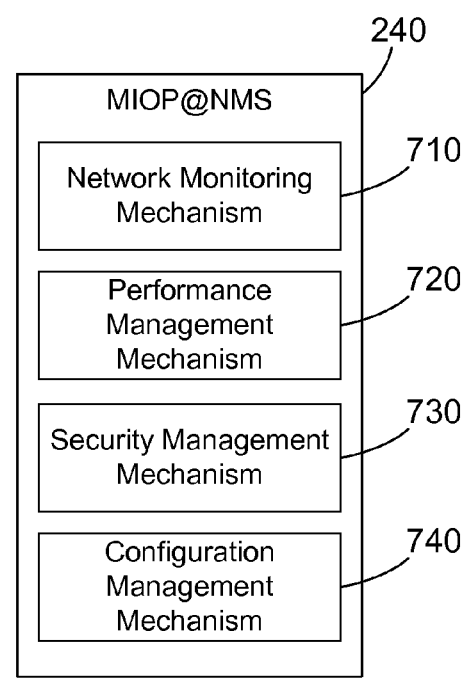
FIG. 7 is a block diagram of a management mechanism coupled to the overlay network that manages the functions of MIOP@NodeB, MIOP@RNC, and MIOP@Core.

Referring to FIG. 7, the MIOP@NMS 240 is a network management system that monitors and manages performance of the mobile data network 200, and controls the function of MIOP@NodeB 210, MIOP@RNC 220, and MIOP@Core 230. MIOP@NMS 240 preferably includes a network monitoring mechanism 710, a performance management mechanism 720, a security management mechanism 730, and a configuration management mechanism 740. The network monitoring mechanism 710 monitors network conditions, such as alarms, in the mobile data network 200. The performance management mechanism 720 can enable, disable or refine certain services by supporting the execution of services in real-time or near real-time, such as services that gather information to assess customer satisfaction. The security management mechanism 730 manages security issues in the mobile data network, such as intrusion detection or additional data privacy. The configuration management mechanism 740 controls and manages the configuration of MIOP@NodeB 210, MIOP@RNC 220, and MIOP@Core 230 in a way that allows them to dynamically adapt to any suitable criteria, including data received from the network monitoring mechanism, time of day, information received from business intelligence 560, etc.

Figure 9:
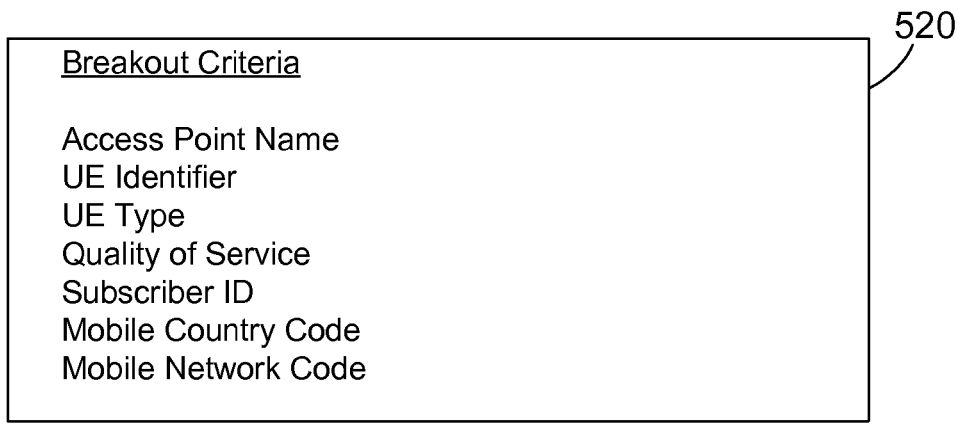
FIG. 9 is a block diagram showing breakout criteria MIOP@RNC may use in making a decision of whether or not to break out data.
Figure 11:
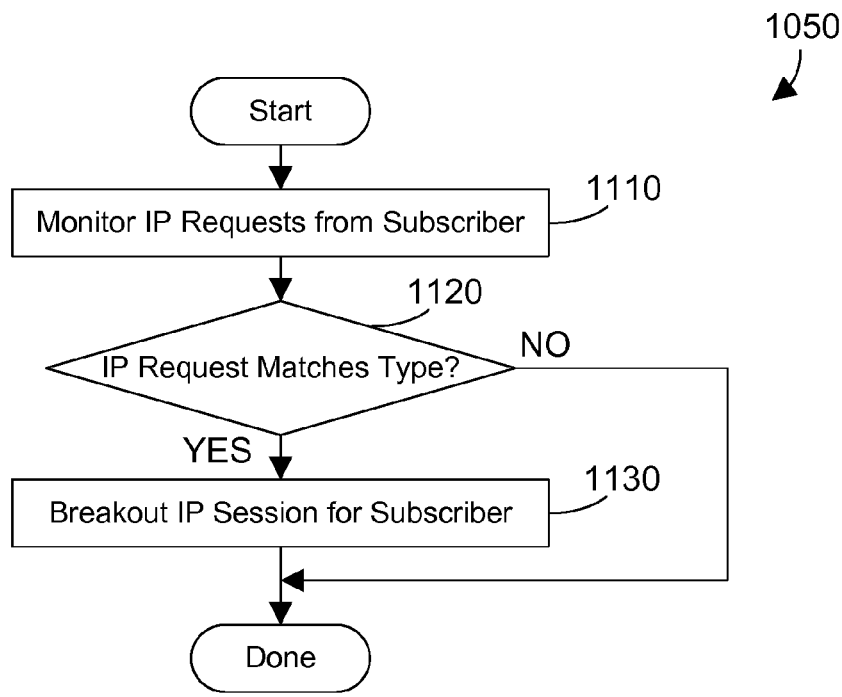
FIG. 11 is a flow diagram of a method for the first service mechanism in MIOP@NodeB to selectively break out data when break out for a specified subscriber session has been authorized.

FIG. 9 shows sample breakout criteria 520 shown in FIG. 5 and used in step 1020 in FIG. 10. Suitable breakout criteria 520 includes access point name, user equipment identifier, user equipment type, quality of service, subscriber ID, mobile country code, and mobile network code. For example, breakout criteria 520 could specify to perform MIOP services for the operator's subscribers, and not to perform MIOP services for roamers. In another example, the breakout criteria 520 could specify to break out only video requests. A static breakout decision will be performed during PDP Context Activation. Based on IP flows (e.g. shallow packet inspection of the IP 5 tuple) only specific IP flows maybe identified and broken out dynamically within that PDP subscriber session (e.g., VOIP traffic), as discussed in more detail below with respect to FIG. 11. Breakout criteria 520 expressly extends to any suitable criteria for making the breakout decision.

Referring again to FIG. 10, when the traffic satisfies the breakout criteria (step 1020=YES), and the subscriber session is registered for breakout (step 1030=YES), MIOP@RNC sends a message to MIOP@NodeB authorizing breakout of traffic for this subscriber session (step 1040). In response, MIOP@NodeB begins decrypting the bearer, examining the signaling and user IP traffic tunneled through it and may breakout the traffic for this subscriber session (step 1050). Note, however, MIOP@NodeB may still decide not to breakout all traffic based on other criteria, such as type of IP request the destination of the traffic or the ISO Layer 7 Application of the decrypted user traffic. Determination of the Application may be performed simply by inspection of the IP 5-tuple or optionally via inspection at layer 7 using Deep Packet Inspection (DPI) techniques. This is shown in the specific example in FIG. 11. Method 1050 in FIG. 10 is one suitable implementation of step 1050 in FIG. 10. MIOP@NodeB monitors IP requests from the subscriber (step 1110). When the user traffic IP request matches a specified type criteria (step 1120=YES), the IP session is broken out for the subscriber (step 1130). When the IP request does not match a specified criteria type (step 1120=NO), no breakout is performed. For example, let's assume that IP requests to access video over the RTP layer 7 Application Protocol are broken out so the video data may be cached in MIOP@NodeB 210, but other requests, such as Google searches, are not. The MIOP@NodeB monitors the IP requests from the subscriber (step 1110), and when the subscriber session IP request carries RTP traffic is for a video file (step 1120=YES), the IP session is broken out (step 1130). Otherwise, the IP session is not broken out at MIOP@NodeB. This is one simple example to illustrate additional flexibility and intelligence within MIOP@NodeB that may determine whether or not to perform breakout for a given subscriber session at the MIOP@NodeB after being authorized by MIOP@RNC to perform breakout for that subscriber session. Any suitable criteria could be used to determine what to breakout and when at MIOP@NodeB once MIOP@NodeB has been authorized for breakout in step 1040 in FIG. 10.

Figure 12:
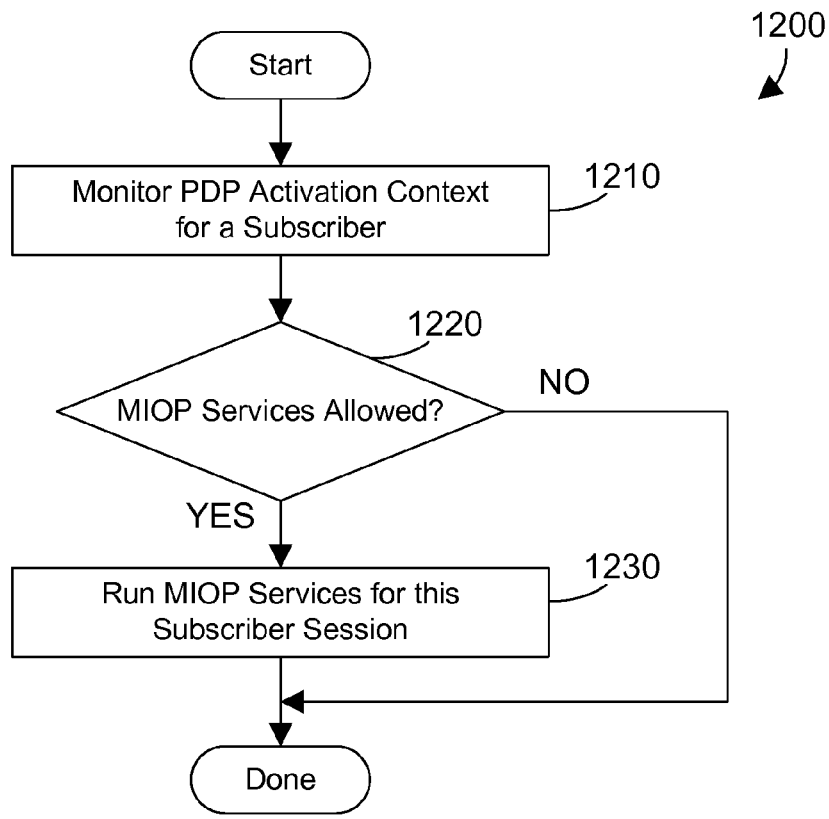
FIG. 12 is a flow diagram of a method for determining when to run MIOP services for a specified subscriber session.

Referring to FIG. 12, method 1200 shows a method for determining when to run MIOP services. The Packet Data Protocol (PDP) activation context for a subscriber is monitored (step 1210). A PDP activation context is established when user equipment 110 connects to tower 120 and the subscriber runs an application that triggers the PDP activation procedure. The core network will determine the subscriber, and perhaps corresponding user equipment. When MIOP services are allowed (step 1220=YES), services for this subscriber session are run (step 1230) upon the arrival of data from the subscriber. When MIOP services are not allowed (step 1220=NO), no MIOP services are run. In one simple example, MIOP services in the mobile data network are allowed for authorized subscribers, but are not allowed for subscribers from a different wireless company that are roaming.

Figure 13:
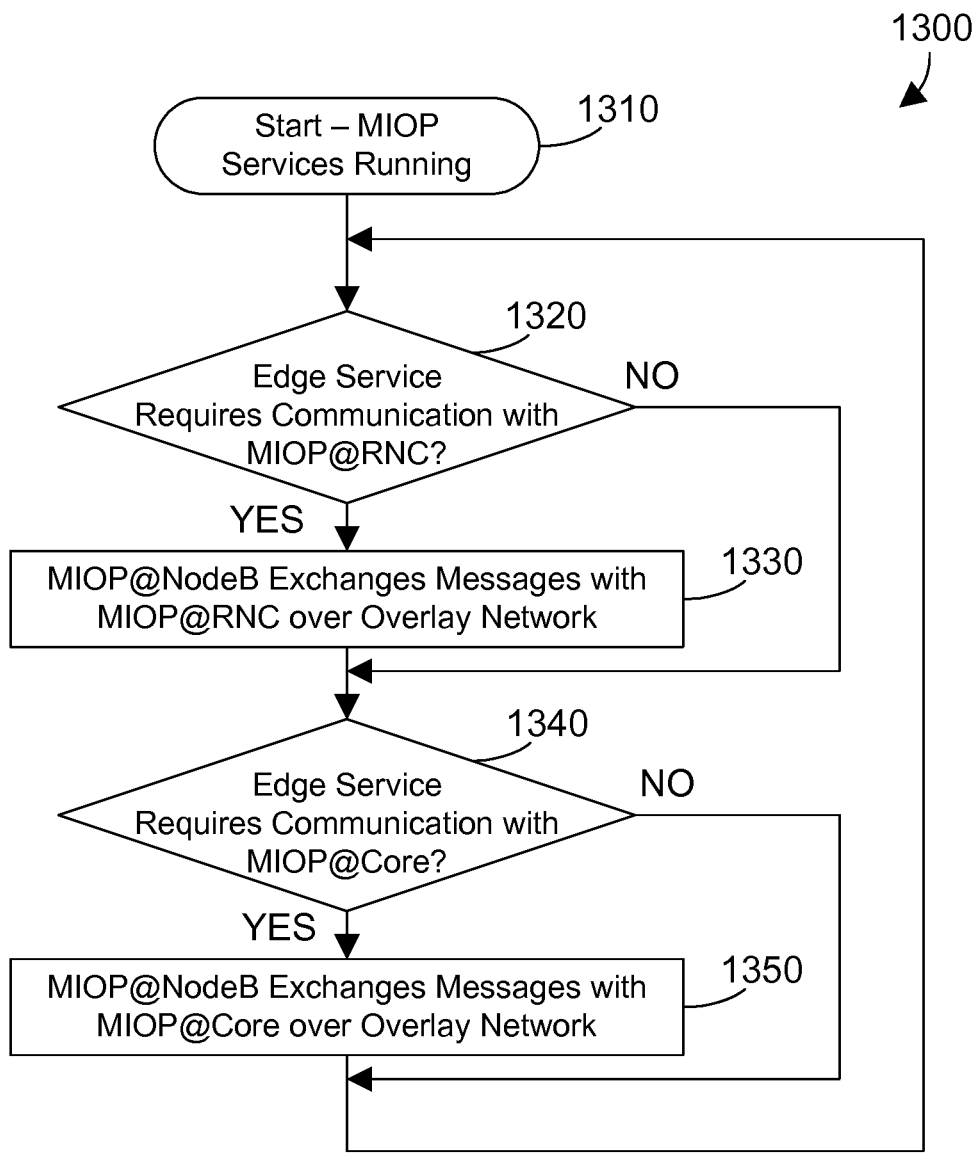
FIGS. 13-15 are flow diagrams that each show communications between MIOP components when MIOP services are running.

MIOP services may require communicating between MIOP components on the overlay network. Referring to FIG. 13, a method 1300 shows communications by MIOP@NodeB when MIOP services are running (step 1310). When the edge service mechanism requires communication with MIOP@RNC (step 1320=YES), MIOP@NodeB exchanges messages with MIOP@RNC over the overlay network (step 1330). When the edge service mechanism requires communication with MIOP@Core (step 1340=YES), MIOP@NodeB exchanges messages with MIOP@Core over the overlay network (step 1350). The overlay network thus allows the various MIOP components to communicate with each other when MIOP services are running.

Figure 14:
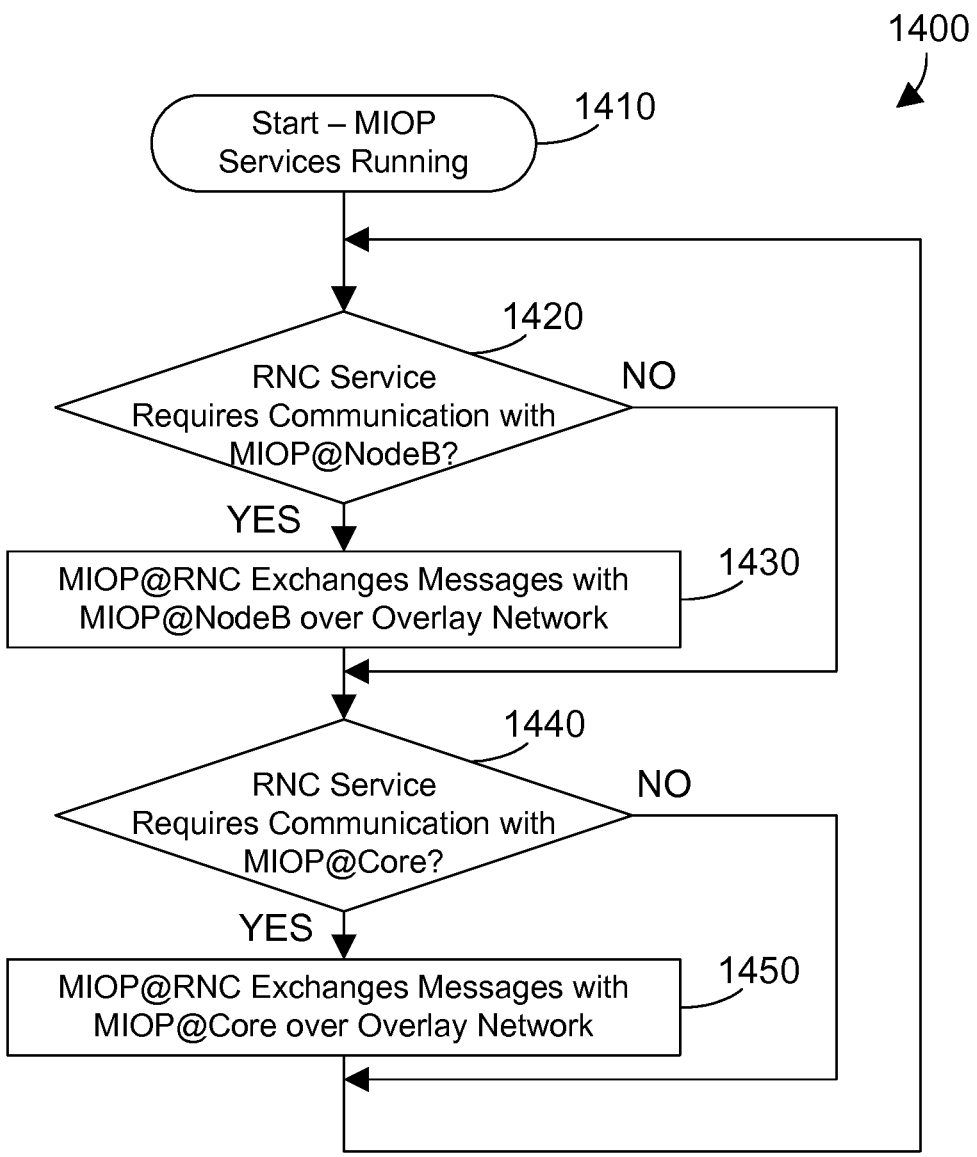

FIG. 14 shows a method 1400 that shows communications by MIOP@RNC when MIOP services are running (step 1410). When the RNC service mechanism requires communication with MIOP@NodeB (step 1420=YES), MIOP@RNC exchanges messages with MIOP@NodeB over the overlay network (step 1430). When the RNC service mechanism requires communication with MIOP@Core (step 1440=YES), MIOP@RNC exchanges messages with MIOP@Core over the overlay network (step 1450).

Figure 15:
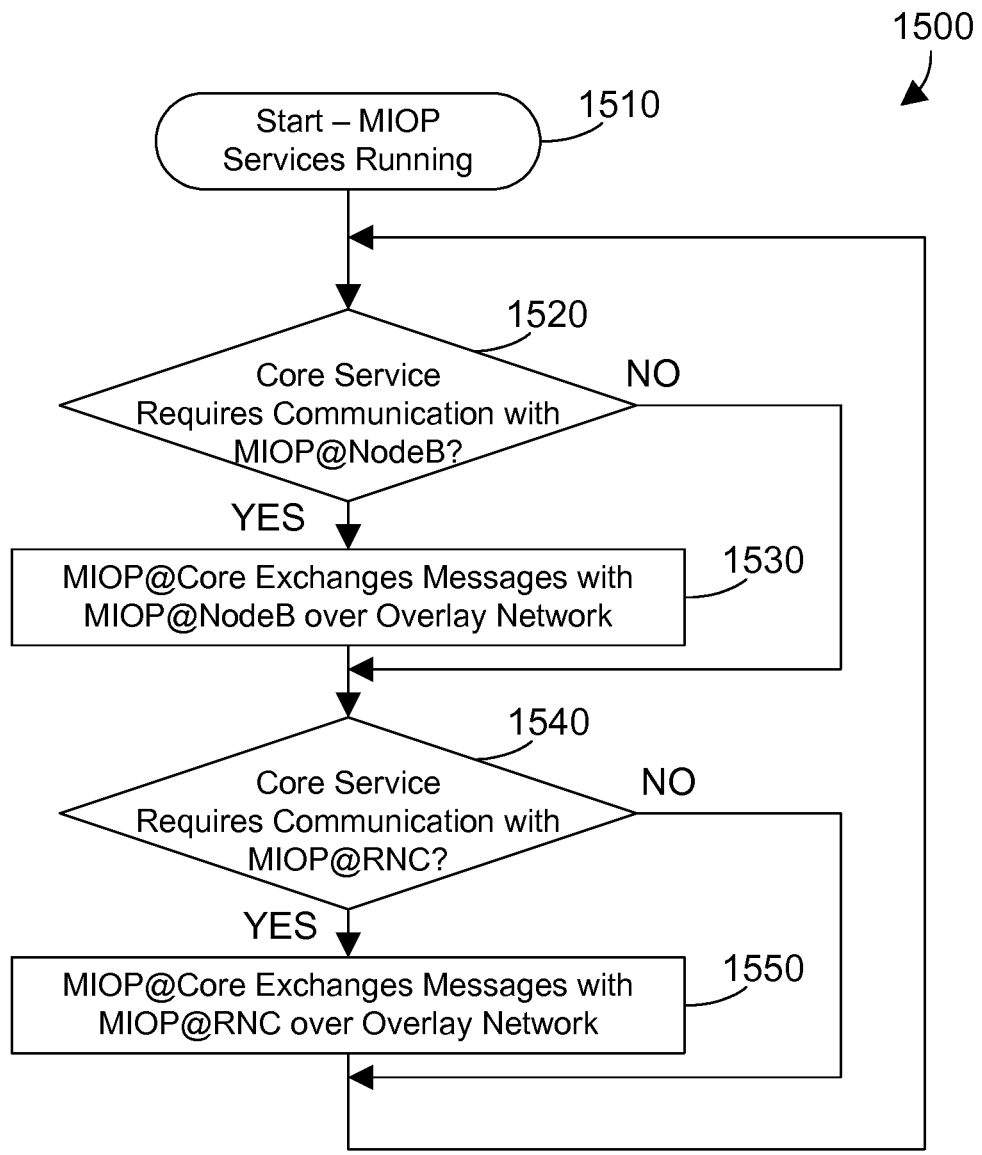

FIG. 15 shows a method 1500 that shows communications by MIOP@Core when MIOP services are running (step 1510). When the core service mechanism requires communication with MIOP@NodeB (step 1520=YES), MIOP@Core exchanges messages with MIOP@NodeB over the overlay network (step 1530) relayed via MIOP@RNC. When the core service mechanism requires communication with MIOP@RNC (step 1540=YES), MIOP@Core exchanges messages with MIOP@RNC over the overlay network (step 1550).

Figure 16:
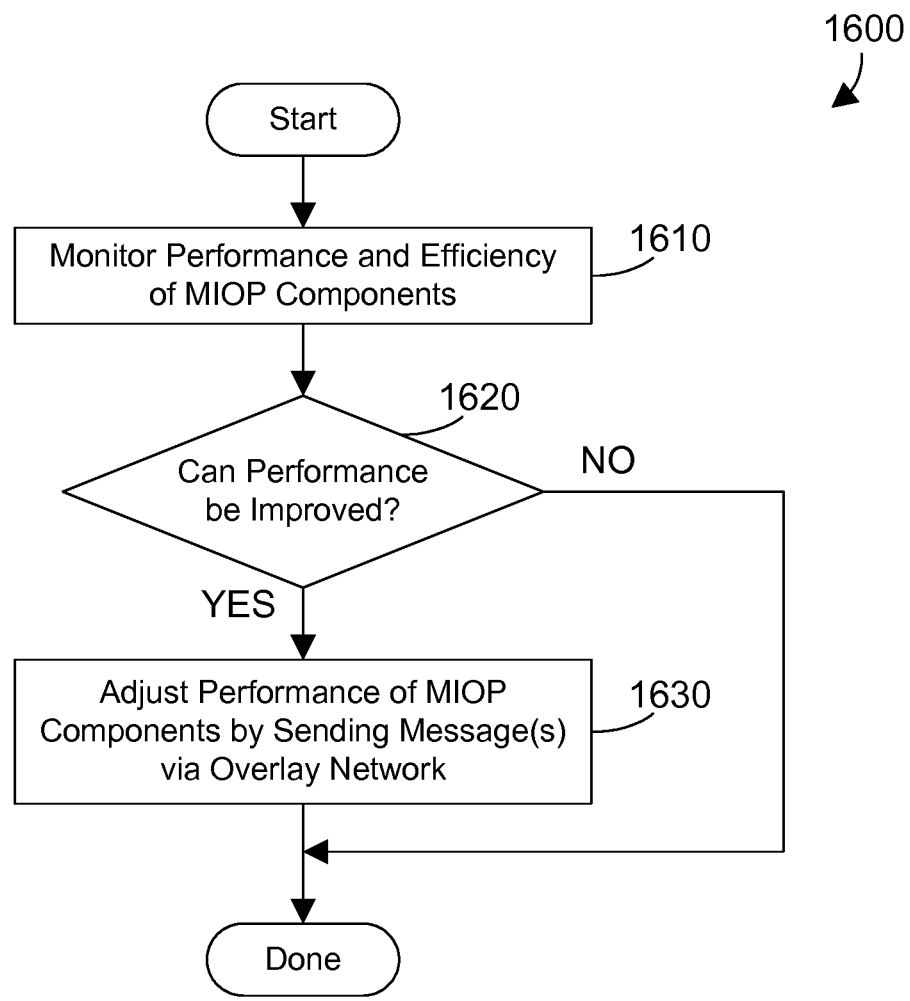
FIG. 16 is a flow diagram of a method for managing and adjusting the MIOP components.

FIG. 16 shows a method 1600 that is preferably performed by MIOP@NMS 240 in FIGS. 2 and 7. The performance and efficiency of the MIOP components that perform MIOP services are monitored (step 1610). The MIOP components that perform MIOP services may include MIOP@NodeB 210, MIOP@RNC 220, and MIOP@Core 230, assuming all of these components are present in the mobile data network 200. When performance may be improved (step 1620=YES), the performance of the MIOP components is adjusted (if implemented and applicable) by sending one or more network messages via the overlay network (step 1630). Note also a human operator could also manually reconfigure the MIOP components to be more efficient.

Figure 17:
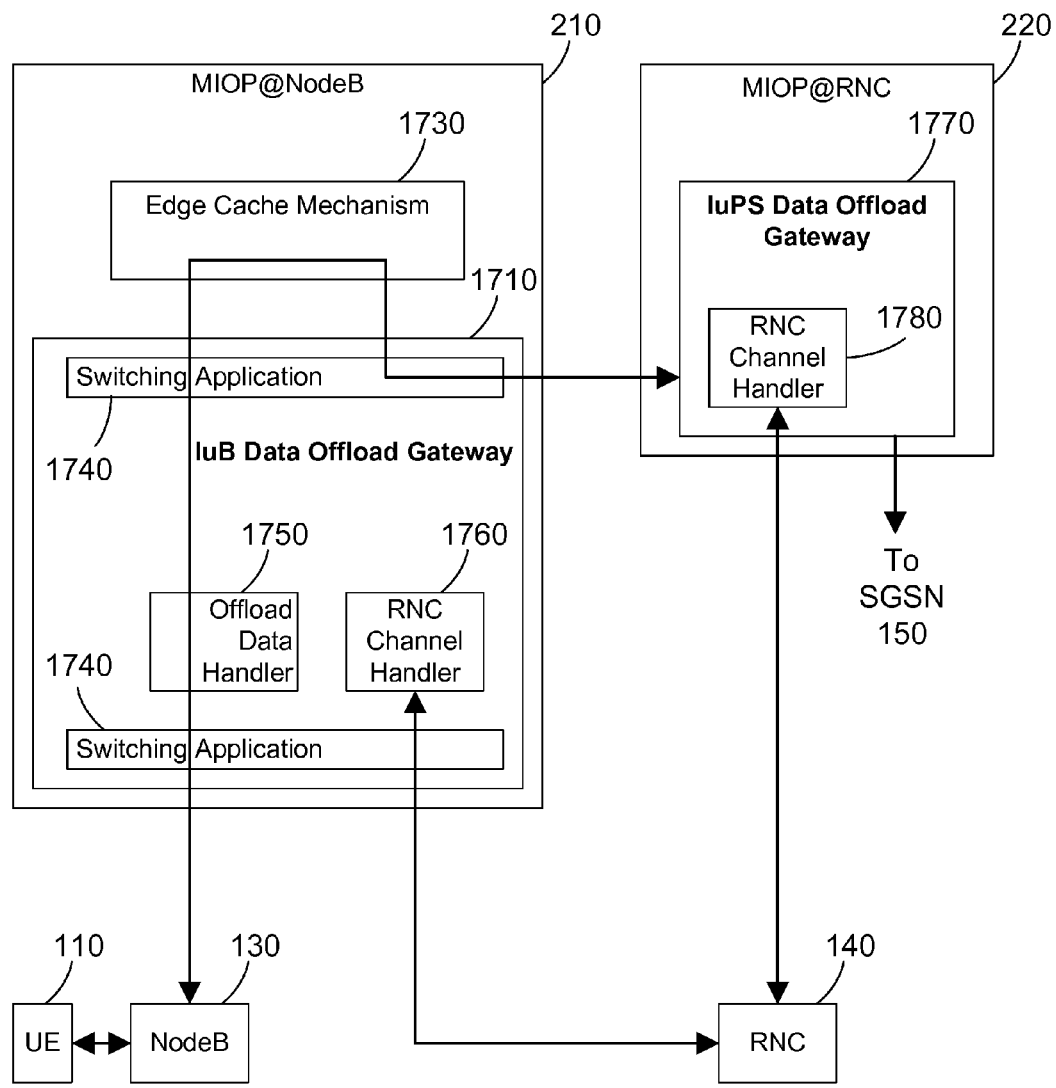
FIG. 17 is a block diagram of one specific implementation for MIOP@NodeB and MIOP@RNC.

Referring to FIG. 17, implementations for MIOP@NodeB 210 and MIOP@RNC 220 are shown by way of example. Other implementations are possible within the scope of the disclosure and claims herein. User equipment 110 is connected to NodeB 130. Note the antenna 120 shown in FIG. 2 is not shown in FIG. 17, but is understood to be present to enable the communication between user equipment 110 and NodeB 130. MIOP@NodeB 210 includes an edge cache mechanism 1730, which is one suitable example of edge service mechanism 430 in FIG. 4. MIOP@NodeB 210 includes an interface referred to herein as IuB Data Offload Gateway (IuB DOGW) 1710. This gateway 1710 implements the breakout mechanism 410 according to one or more specified breakout preconditions 420 shown in FIG. 4. IuB DOGW 1710 includes a switching application 1740, an offload data handler 1750, and an RNC channel handler 1760. The switching application 1740 is responsible for monitoring data packets received from NodeB 130, forwarding the broken out data packets to the offload data handler according to its configuration, and relaying the non-broken out data packets and control system flows to the RNC 140 via the original connections in the RAN. While switching application 1740 is shown as two separate boxes in FIG. 17, this is done to visually indicate the switching application 1740 performs switching on two different interfaces, the network interface and overlay network interface, but the switching application 1740 is preferably a single entity.

When a breakout decision is made and MIOP@RNC 220 sends a message to MIOP@NodeB 210 authorizing breakout (see step 1040 in FIG. 10), when MIOP@NodeB decides to breakout specified user data, the specified user data received by the switching application 1740 from NodeB 130 is broken out, which means the switching application 1740 routes the specified user data to the offload data handler 1750 so the broken out data is routed to the data path defined for breakout data. The offload data handler 1750 may send the data to the edge cache mechanism 1730 for processing, which can route the data directly to MIOP@RNC 220 via the overlay network, as shown by the path with arrows going from NodeB 130 to MIOP@RNC 220.

User data that is not broken out and signaling traffic is routed directly back by the switching application 1740 to RNC. In this manner, non-broken out data and signaling traffic passes through the IuB DOGW 1710 to RNC 140, while broken out data is routed by the IuB DOGW 1710 to a different destination. Note that edge cache mechanism 1730 may send messages to MIOP@RNC 220 as shown in FIG. 17, but the broken out messages themselves are not sent to MIOP@RNC 220.

MIOP@RNC 220 includes an interface referred to herein as IuPS data offload gateway (IuPS DOGW) 1770. IuPS DOGW 1770 forwards all signaling and non-broken out data traffic from RNC 140 to SGSN 150 via the GTP tunnel. IuPS DOGW 1770 includes the breakout mechanism 510, breakout criteria 520 and subscriber registration mechanism 530 shown in FIG. 5 and discussed above with reference to FIG. 5. IuPS DOGW 1770 may exchange messages with IuB DOGW 1710 via the overlay network to perform any needed service in MIOP@NodeB 210 or MIOP@RNC 220. For the specific implementation shown in FIG. 17, while the IuPS DOGW 1770 in MIOP@RNC 220 does not include an offload data handler, the IuPS DOGW 1770 could include an offload data handler and switching application similar to those shown in MIOP@NodeB 210 when MIOP@RNC 220 also needs to perform breakout of data.

The IuPS DOGW 1770 includes an RNC channel handler 1780. The RNC channel handlers 1760 in MIOP@NodeB 210 and 1780 in MIOP@RNC 220 monitor data traffic to and from RNC 140 related to a broken out subscriber session and provide a keep-alive channel maintenance mechanism.

Figure 18:
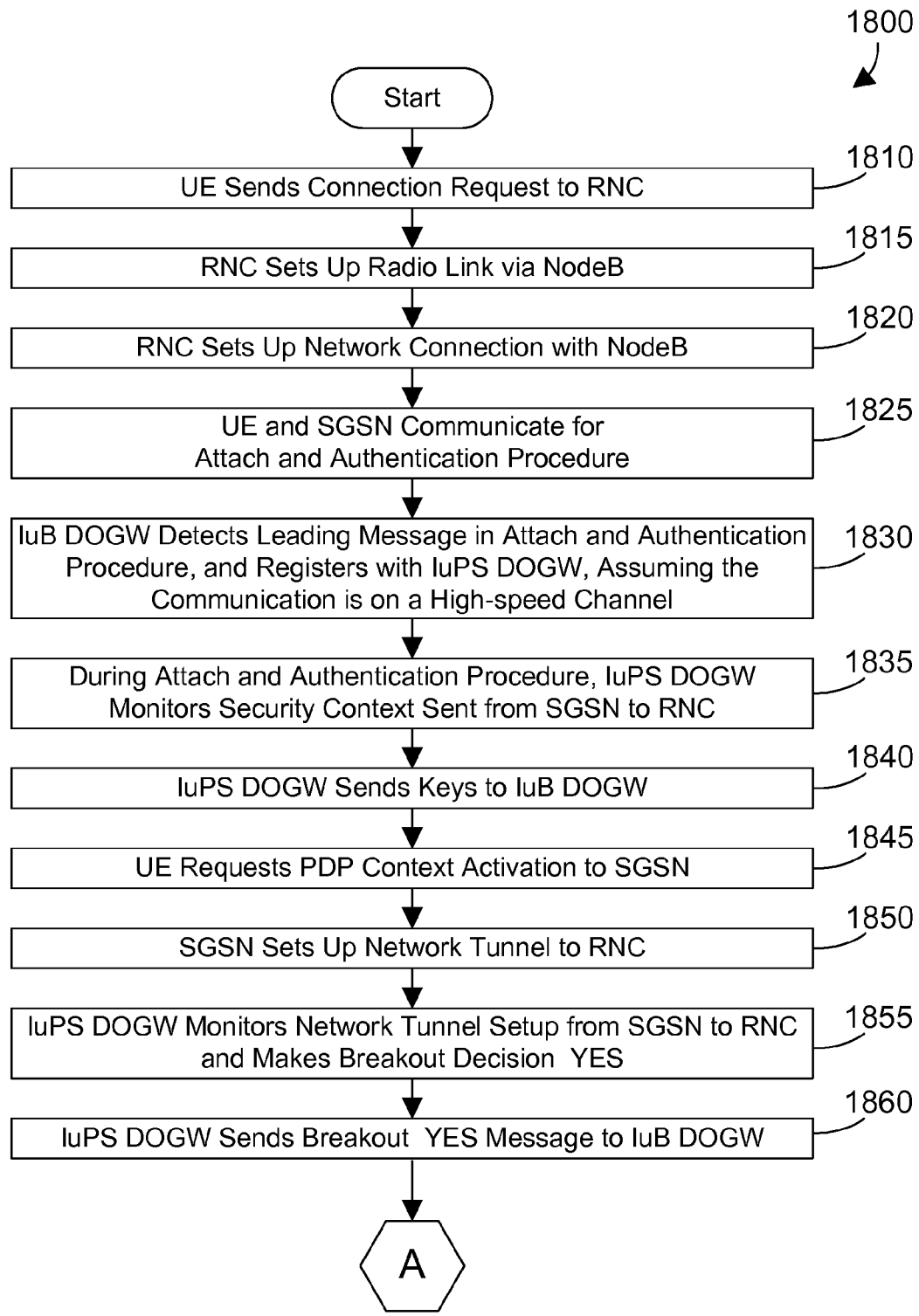
FIGS. 18 and 19 show a flow diagram of a first method for the specific implementation shown in FIG. 17.
Figure 19:
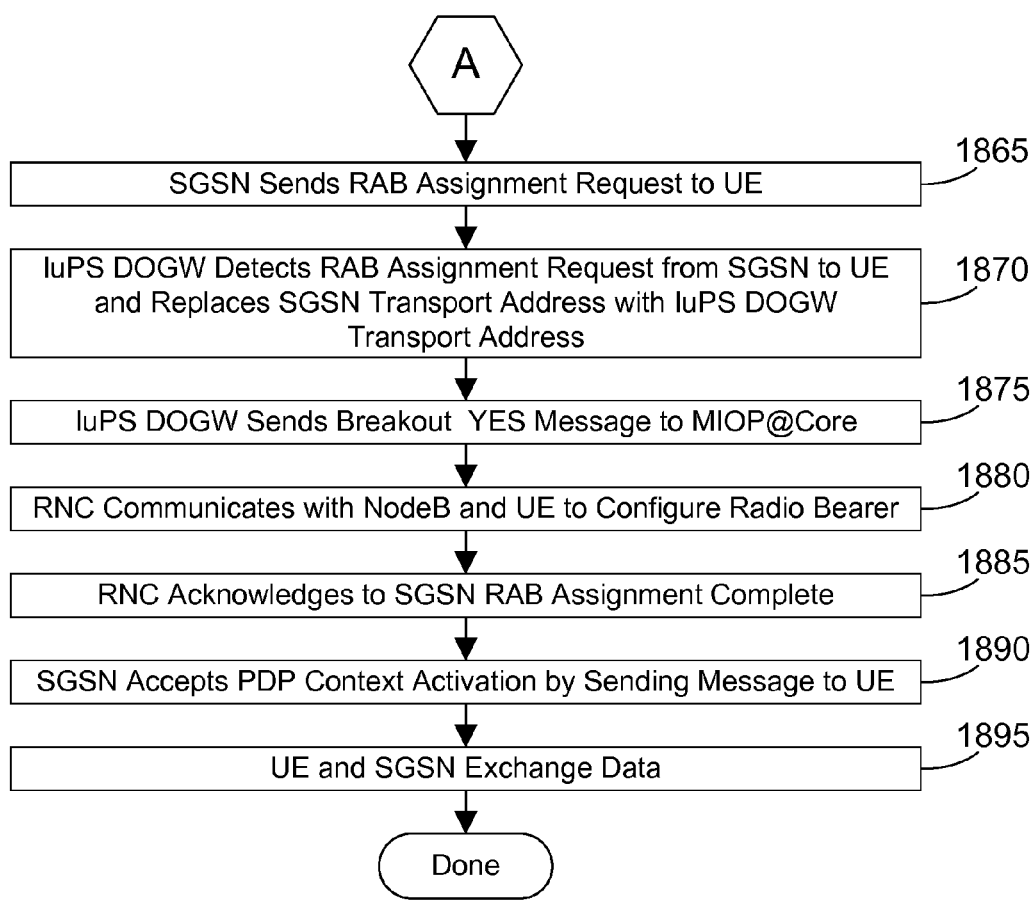

Specific methods are shown in FIGS. 18-21 that illustrate how the specific implementation in FIG. 17 could be used. FIGS. 18 and 19 show a method 1800 for setting up breakout of data. The UE sends a connection request to the RNC (step 1810). The RNC sets up a radio link via NodeB (step 1815). The RNC then sets up a network connection with NodeB (step 1820). The UE and SGSN then communicate for the attach and authentication procedure (step 1825). IuB DOGW detects the leading message in the attach and authentication procedure, and registers the subscriber session with IuPS DOGW when preconditions are fulfilled (e.g. UE is capable to carry high speed traffic) (step 1830). During the attach and authentication procedure, IuPS DOGW monitors the security context sent from SGSN to RNC (step 1835). IuPS DOGW then sends keys to IuB DOGW (step 1840). These keys are needed to decipher (decrypt) the upcoming signaling and uplink user data and to cipher (encrypt) the downlink user data. UE then requests PDP context activation to SGSN (step 1845). In response, SGSN sets up a network tunnel to RNC (step 1850). IuPS DOGW monitors network tunnel setup from SGSN to RNC and makes a decision breakout=YES (step 1855). IuPS DOGW sends a message to IuB DOGW indicating breakout=YES (step 1860). Continuing on FIG. 19, SGSN sends an RAB assignment request to UE (step 1865). IuPS DOGW detects the RAB assignment request from SGSN to UE and replaces the SGSN transport address with IuPS DOGW transport address (step 1870). IuPS DOGW sends a message to MIOP@Core indicating breakout=YES (step 1875). RNC communicates with NodeB and UE to (re) configure signaling and data radio bearer (step 1880). RNC acknowledges to SGSN when RAB assignment is complete (step 1885). SGSN accepts PDP context activation by sending a message to UE (step 1890). UE and SGSN may then exchange data for the PDP context (step 1895).

Figure 20:
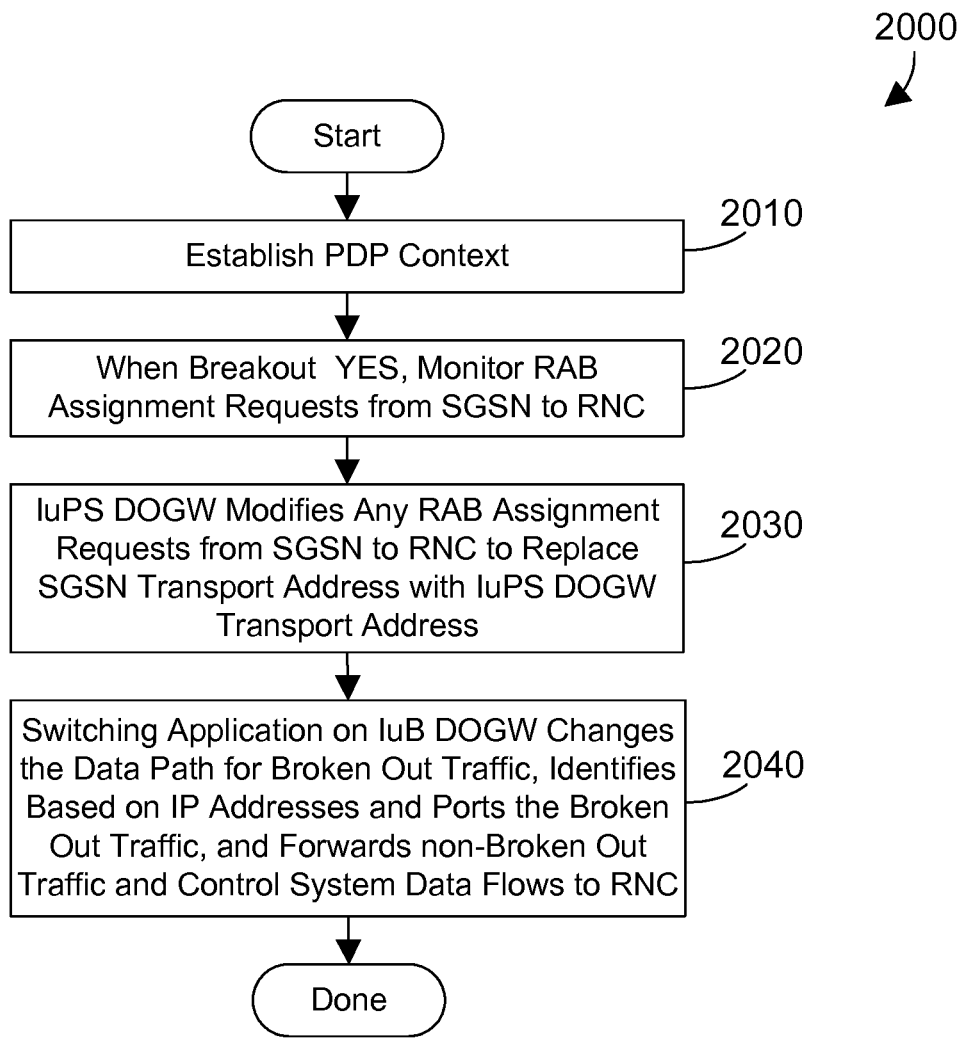
FIG. 20 is a flow diagram of a second method for the specific implementation shown in FIG. 17.

Referring to FIG. 20, a method 2000 begins by establishing a PDP context (step 2010). Method 1800 in FIGS. 18 and 19 include the detailed steps for establishing a PDP context. When breakout=YES, RAB assignment requests from SGSN to RNC are monitored by IuPS DOGW (step 2020). IuPS DOGW modifies any RAB assignment requests from SGSN to RNC to replace the SGSN transport address in the RAB assignment request with the IuPS DOGW transport address (step 2030) in case of matching breakout criteria during PDP context activation procedure. The switching application on IuB DOGW is configured upon the RAN transport layer setup to identify based on IP addresses and ports the broken out traffic and forwards this traffic to the Offload data handler 1765, and forwards non-broken out traffic and control system data flows to the RNC (step 2040).

Figure 21:
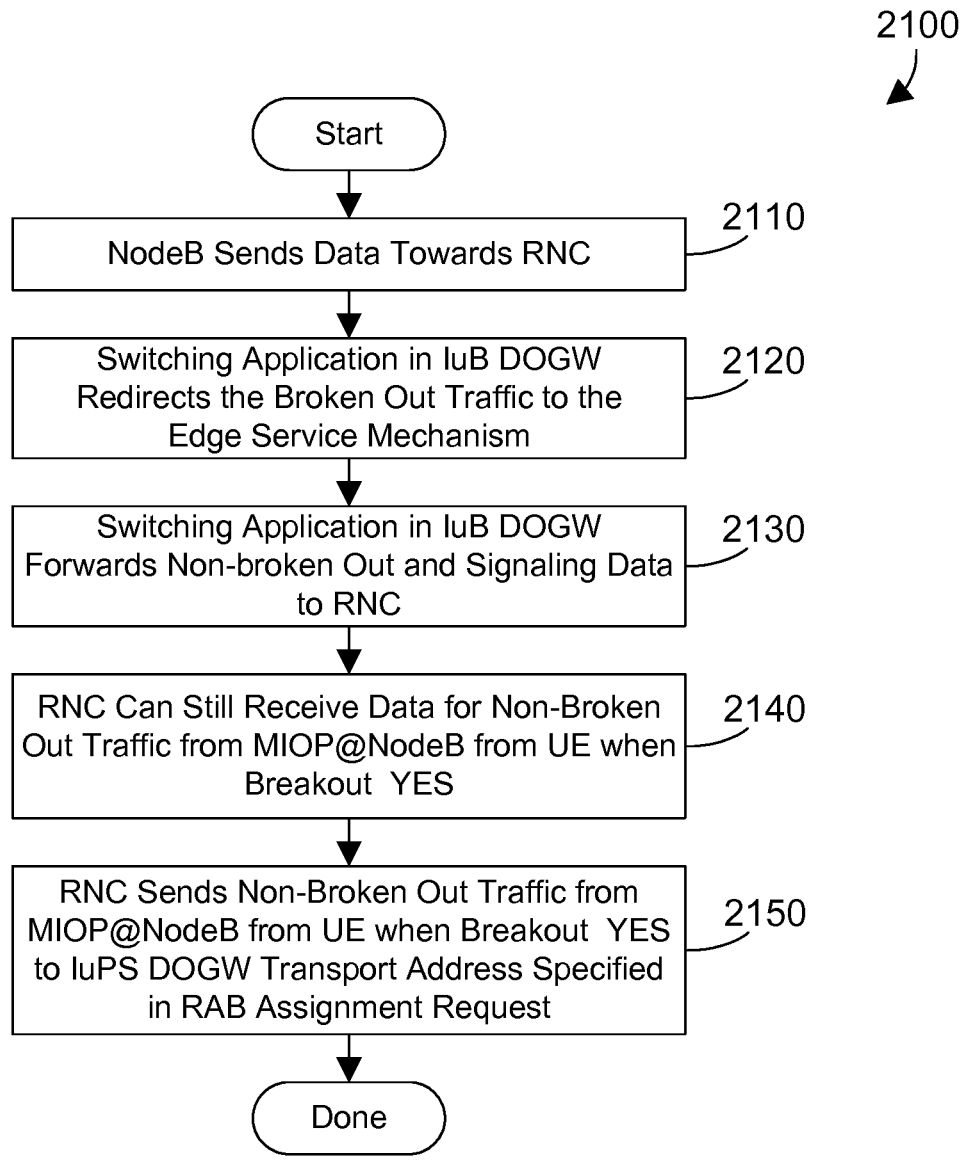
FIG. 21 is a flow diagram of a third method for the specific implementation shown in FIG. 17.

Referring to FIG. 21, a method 2100 begins when NodeB sends data towards RNC (step 2110). The switching application in IuB DOGW redirects the broken out traffic to the edge service mechanism (step 2120), such as edge cache mechanism 1730 in FIG. 17. The switching application also forwards non-broken out data and signaling data to the RNC (step 2130) via the original RAN connections. The RNC can still receive data for non-broken out traffic from MIOP@NodeB when breakout=YES (step 2140). The RNC then sends non-broken out traffic from MIOP@NodeB from UE when breakout=YES to IuPS DOGW transport address specified in RAB assignment request (step 2150).

Figure 22:
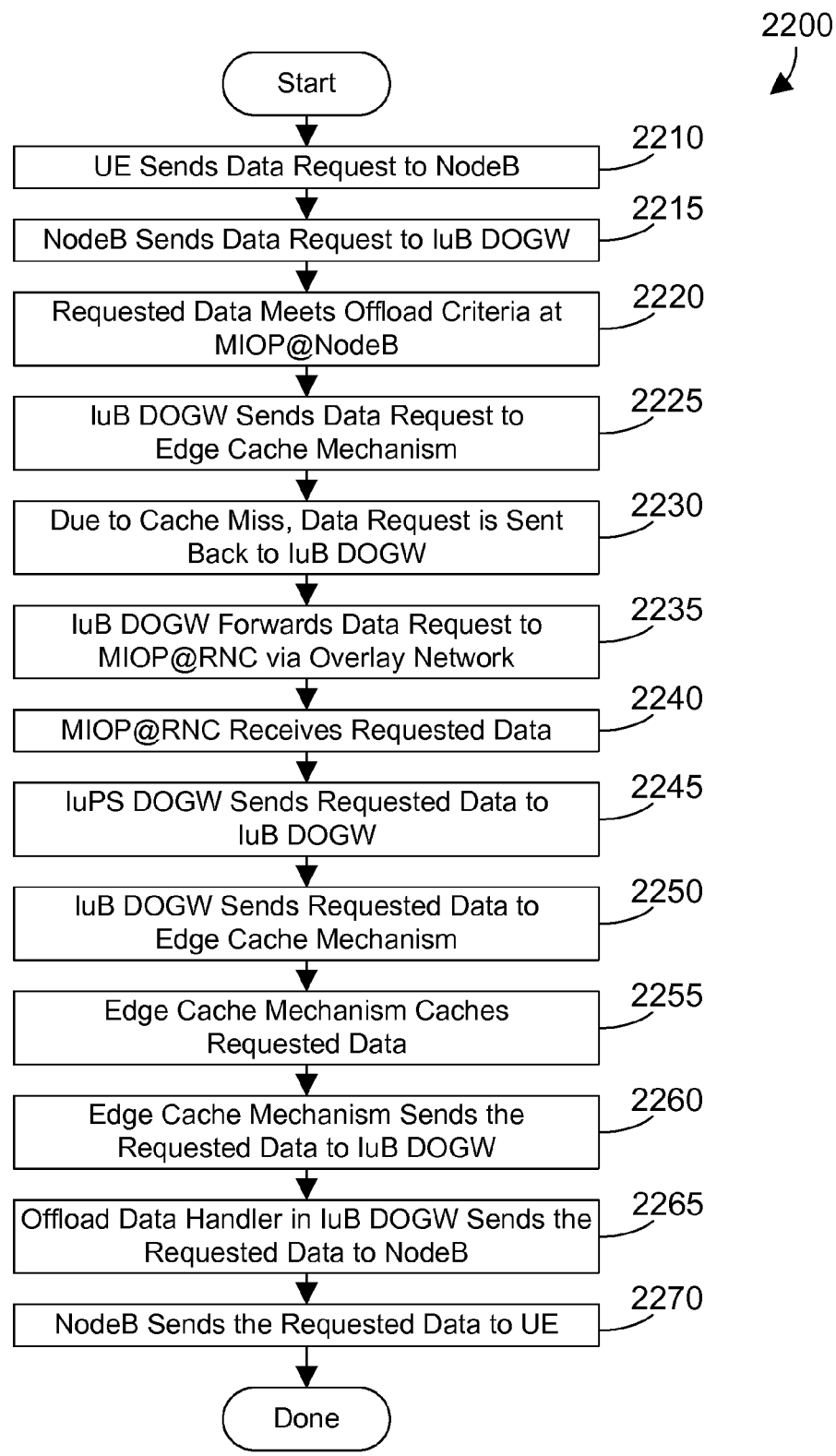
FIG. 22 is a flow diagram of a method for the specific implementation shown in FIG. 17 to process a data request that results in a cache miss at MIOP@NodeB.

A simple example is now provided for the specific implementation in FIG. 17 to show how data can be cached and delivered by MIOP@NodeB 210. Referring to FIG. 22, method 2200 represents steps performed in the implementation in FIG. 17 for a cache miss. UE sends a data request to NodeB (step 2210). NodeB sends the data request to IuB DOGW (step 2215). We assume the requested data meets the offload criteria at MIOP@NodeB (step 2220), which means MIOP@NodeB has been authorized to perform breakout and has determined this requested data should be broken out. IuB DOGW sends the data request to the edge cache mechanism (step 2225). We assume the data is not present in the edge cache mechanism, so due to the cache miss, the edge cache mechanism sends the data request back to IuB DOGW (step 2230). IuB DOGW then forwards the data request to MIOP@RNC via the overlay network (step 2235). In the worst case the content is not cached on MIOP@RNC or MIOP@Core, MIOP@RNC routes the data request to via the overlay network to the MIOP@Core, which passes the data request up the line to the internet, which delivers the requested data to MIOP@Core, which delivers the requested data via the overlay network to MIOP@RNC (step 2240). IuPS DOGW then sends the requested data to IuB DOGW (step 2245). IuB DOGW then sends the requested data to the edge cache mechanism (step 2250). The edge cache mechanism caches the requested data (step 2255). The edge cache mechanism sends the requested data to IuB DOGW (step 2260). The offload data handler in IuB DOGW sends the requested data to NodeB (step 2265). NodeB then sends the requested data to UE (step 2270). At this point, method 2200 is done.

Figure 23:
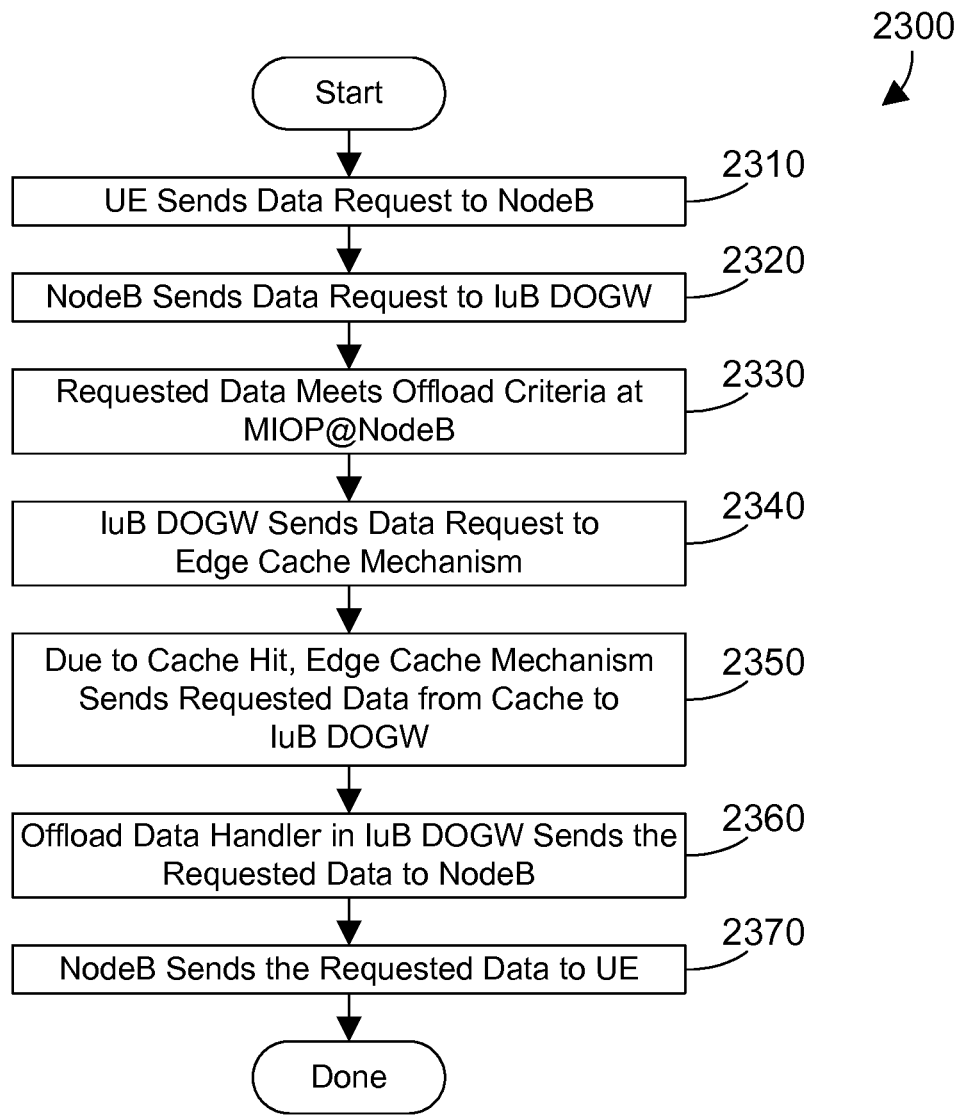
FIG. 23 is a flow diagram of a method for the specific implementation shown in FIG. 17 to process a data request that results in a cache hit at MIOP@NodeB.

Method 2300 in FIG. 23 shows the steps performed for a cache hit in the specific implementation in FIG. 17. The UE sends the data request to NodeB (step 2310). NodeB sends the data request to IuB DOGW (step 2320). The requested data meets the offload criteria at MIOP@NodeB (step 2330). IuB DOGW sends the data request to the edge cache mechanism (step 2340). Due to a cache hit, the edge cache mechanism sends the requested data from the cache to IuB DOGW (step 2350). The offload data handler in IuB DOGW sends the requested data to NodeB (step 2360). Node B then sends the requested data to UE (step 2370). Method 2300 shows a great advantage in caching data at MIOP@NodeB. With data cached at MIOP@NodeB, the data may be delivered to the user equipment without any backhaul on the core network. The result is reduced network congestion in the core network while improving quality of service to the subscriber.

The methods shown in FIGS. 18-23 provide detailed steps for the specific implementation in FIG. 17. Other implementations may have detailed steps that are different than those shown in FIGS. 18-23. These are shown by way of example, and are not limiting of the disclosure and claims herein.

The architecture of the MIOP system allows services to be layered or nested. For example, the MIOP system could determine to do breakout of high-speed channels at MIOP@NodeB, and to do breakout of low-speed channels at MIOP@RNC. In another example, MIOP@NodeB may have a cache, MIOP@RNC may also have a cache, and MIOP@Core may also have a cache. If there is a cache miss at MIOP@NodeB, the cache in MIOP@RNC could be checked, followed by checking the cache in MIOP@Core. Thus, decisions can be dynamically made according to varying conditions of what data to cache and where.

To support the MIOP services that are possible with the mobile data network 200 shown in FIG. 2, the preferred configuration of MIOP@NodeB 210 is a combination of hardware and software. The preferred configuration of MIOP@RNC 220 is also a combination of hardware and software. The preferred configuration of MIOP@Core 230 is software only, and can be run on any suitable hardware in the core network. The preferred configuration of MIOP@NMS 240 is software only, and can also be run on any suitable hardware in the core network.

In the most preferred implementation, the various functions of MIOP@NodeB 210, MIOP@RNC 220, MIOP@Core 230, and MIOP@NMS 240 are performed in a manner that is nearly transparent to existing equipment in the mobile data network. Thus, the components in prior art mobile data network 100 that are also shown in the mobile data network 200 in FIG. 2 have no knowledge of the existence of the various MIOP components, with the exception of existing routers that may need to be updated with routing entries corresponding to the MIOP components. The MIOP services are provided by the MIOP components in a way that requires no changes to hardware and only minor changes to software (i.e., new router entries) in any existing equipment in the mobile data network, thereby making the operation of the MIOP components transparent to the existing equipment once the MIOP components are installed and configured. The result is a system for upgrading existing mobile data networks as shown in FIG. 1 in a way that does not require extensive hardware or software changes to the existing equipment. The MIOP services herein can thus be performed without requiring significant capital expenditures to replace or reprogram existing equipment.

MIOP@NodeB is preferably an appliance. The difference between a traditional hardware/software solution and an appliance is the appliance interface hides the underlying hardware and software configuration from the users of the appliance, whether the user is a man or a machine. Appliances for different applications are known in the art. For example, a network switch is one example of a known appliance. A network switch typically provides a web-based interface for configuring the switch with the appropriate configuration parameters. From the web-based interface, it is impossible to tell the internal hardware and software configuration of a network switch. The only commands available in the web-based interface for the network switch are those commands needed to configure and otherwise control the function of the network switch. Other functions that might be supported in the hardware are hidden by the appliance interface. This allows an interface that is independent from the hardware and software implementation within the appliance. In similar fashion, MIOP@NodeB is preferably an appliance with a defined interface that makes certain functions needed to configure and operate MIOP@NodeB available while hiding the details of the underlying hardware and software. This allows the hardware and software configuration of MIOP@NodeB to change over time without having to change the appliance interface.

MIOP@RNC is also preferably an appliance, but unlike any known appliance. MIOP@NodeB, like all known appliances (such as network switches), resides within a single enclosure. Known appliances thus provide an interface for everything within a single enclosure. MIOP@RNC, in contrast, includes hardware and software in different enclosures. The disclosure and claims herein thus extend the concept of "appliance" to include hardware and software in different enclosures that are coupled so they can communicate with each other. In this context, the appliance essentially provides a "wrapper" that encapsulates different hardware and software in different enclosures as if they resided in the same enclosure. Details of the MIOP@RNC appliance are shown below with reference to FIGS. 24-39.

Figure 24:
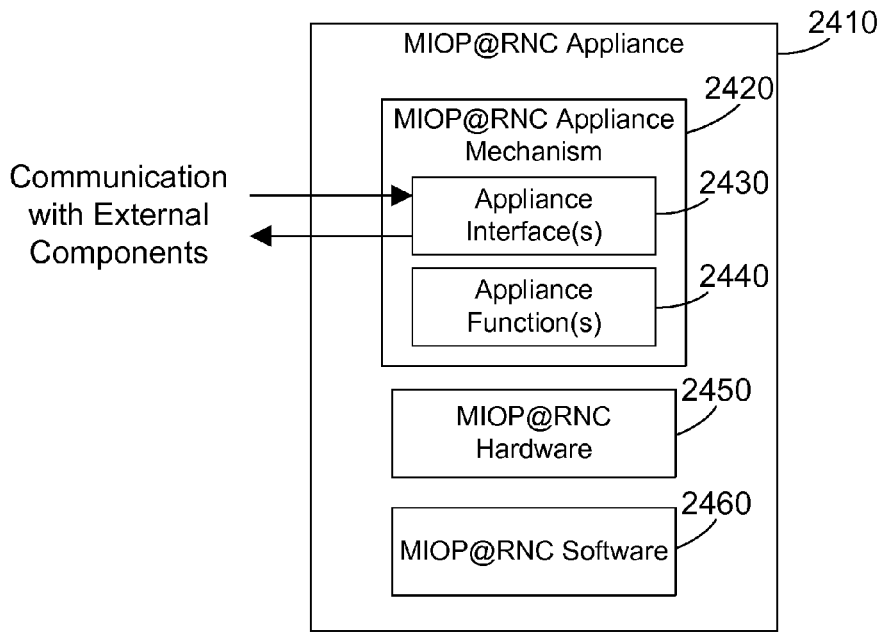
FIG. 24 is a block diagram of a general representation of MIOP@RNC.

Referring to FIG. 24, MIOP@RNC appliance 2410 is one suitable general representation of MIOP@RNC 220 shown in FIG. 2. The MIOP@RNC appliance 2410 includes MIOP@RNC hardware 2450 and MIOP@RNC software 2460. The MIOP@RNC hardware 2450 and MIOP@RNC software 2460 reside within different enclosures, as shown in the specific configuration in FIG. 25. The MIOP@RNC appliance 2410 includes a MIOP@RNC appliance mechanism 2420 that provides the appliance view of MIOP@RNC to all external components in the mobile data network. The MIOP@RNC appliance mechanism 2420 includes one or more appliance interfaces 2430 and one or more appliance functions 2440 defined for each of the appliance interfaces 2430. All communication with the MIOP@RNC appliance 2410 from external components in the mobile data network occurs via the appliance interface(s) 2430 as shown in FIG. 24. In this manner, the MIOP@RNC appliance mechanism 2420 logically packages different hardware and software in different enclosures as part of a single logical appliance. In fact, the MIOP@RNC appliance mechanism 2420 could treat hardware and software in a location that is remote from other hardware and software in the appliance as part of the appliance, notwithstanding the remote location. The MIOP@RNC appliance is thus a logical construct that spans across multiple enclosures and may even span distance. Because known appliances all reside within a single box, extending the appliance concept to multiple enclosures is not known in the art.

Figure 25:
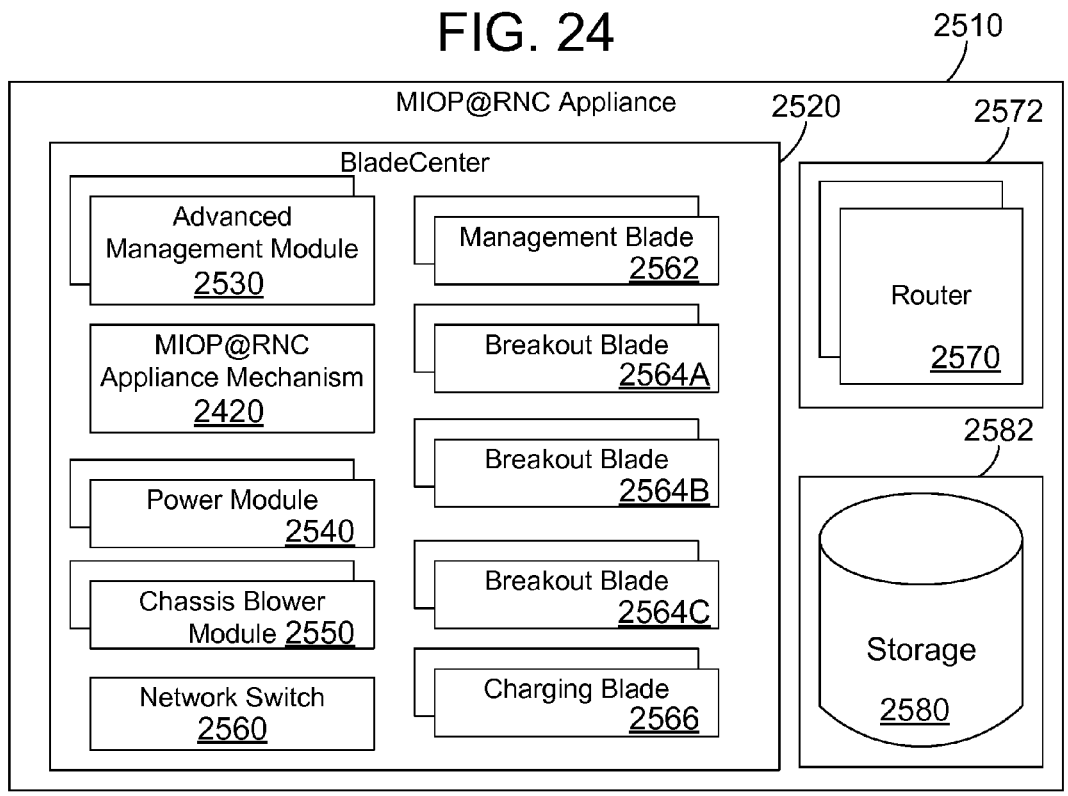
FIG. 25 is a block diagram of one specific implementation for MIOP@RNC.

One suitable implementation for the MIOP@RNC appliance 2410 in FIG. 24 is shown as MIOP@RNC appliance 2510 in FIG. 25. In this configuration, the MIOP@RNC appliance 2510 is implemented in a BladeCenter 2520, which is a rack of equipment that includes multiple computer servers referred to as "blades." For the specific implementation shown in FIG. 25, the BladeCenter 2520 includes a management blade 2562, three breakout blades 2564A, 2564B and 2564C, and a charging blade 2566. Note that each of these blades is shown with a corresponding box behind it, which represents that each blade preferably has a backup blade that can be activated if the active blade fails to provide high availability of the MIOP@RNC appliance 2510. The Blade-Center 2520 is preferably a rack of equipment, with each component in the BladeCenter 2520 occupying one or more slots in the rack. In addition to the blades, there is one or more power modules 2540 that provide power to the blades and other equipment, and one or more chassis blower modules 2550 that provide cooling fans (blowers) to cool the equipment in the rack. A network switch 2560 is also in the rack of the BladeCenter 2520. An advanced management module (AMM) 2530 provides a web interface that allows a user to monitor the blade servers, I/O modules, management modules, power supply fan packs, chassis blower modules, and chassis temperature readings of the BladeCenter 2520, and preferably includes a backup, as shown by the background box for AMM 2530 in FIG. 25. The AMM 2530 could be used by a technician when constructing and testing the Blade-Center 2520. However, the functions of the AMM 2530 are be hidden from the external components in the mobile data network by the MIOP@RNC appliance mechanism 2420. The AMM 2530 could still be configured to perform monitoring and error reporting on components in the BladeCenter 2520, but any errors would be reported to the MIOP@RNC appliance mechanism 2420, which would then provide any needed alerts to human users or external components. Note the MIOP@RNC appliance mechanism 2420 may execute on any blade in the BladeCenter 2520, but most preferably execute on the management blade 2562.

The implementation in FIG. 25 shows many different enclosures. For example, each blade typically has its own enclosure, and is placed in a rack. The rack is another enclosure that houses the hardware components in the rack. The MIOP@RNC appliance 2510 also includes equipment external to the BladeCenter 2520. A network router 2570 housed in a separate enclosure 2572 is part of the MIOP@RNC appliance 2510. In addition, external storage 2580 housed in a separate enclosure 2582 is also part of the MIOP@RNC appliance 2510. The MIOP@RNC appliance 2510 is thus comprised of many different enclosures that communicate with each other and that are logically grouped together. Note that router 2570 and storage 2580 are examples of hardware and software in their own enclosures that could be made part of the MIOP@RNC appliance 2510. The disclosure and claims herein expands the concept of an "appliance" to mean any set of hardware and software, even in different enclosures and in different locations, that may be logically grouped. The MIOP@NodeB appliance thus may include any suitable combination of hardware and software in any suitable number of enclosures in any suitable location.

The appliance interfaces 2430 and appliance functions 2440 defined on those interfaces in FIG. 24 provide an interface to external components that hides the internal implementation of the appliance. For example, let's assume the management blade 2562 in FIG. 25 fails. This failure could generate a trap within the BladeCenter that indicates "blade #1 failed." However, this trap would not be visible to external components, because this deals with hardware implementation details within the MIOP@RNC appliance. Instead, the "blade #1 failed" trap within the MIOP@RNC appliance could generate a "management blade failed" trap external to the MIOP@RNC appliance. External components don't want or need the information that a specific blade number failed, because the numbering of blades depends on specifics of the hardware within the BladeCenter. But a "management blade failed" trap is useful to external components. The appliance interfaces and functions thus provide a level of abstraction that hides the underlying hardware and software implementation of the MIOP@RNC appliance, and limits access by external components to information regarding the MIOP@RNC that is in the defined appliance interfaces 2430 and appliance functions 2440.

Figure 26:
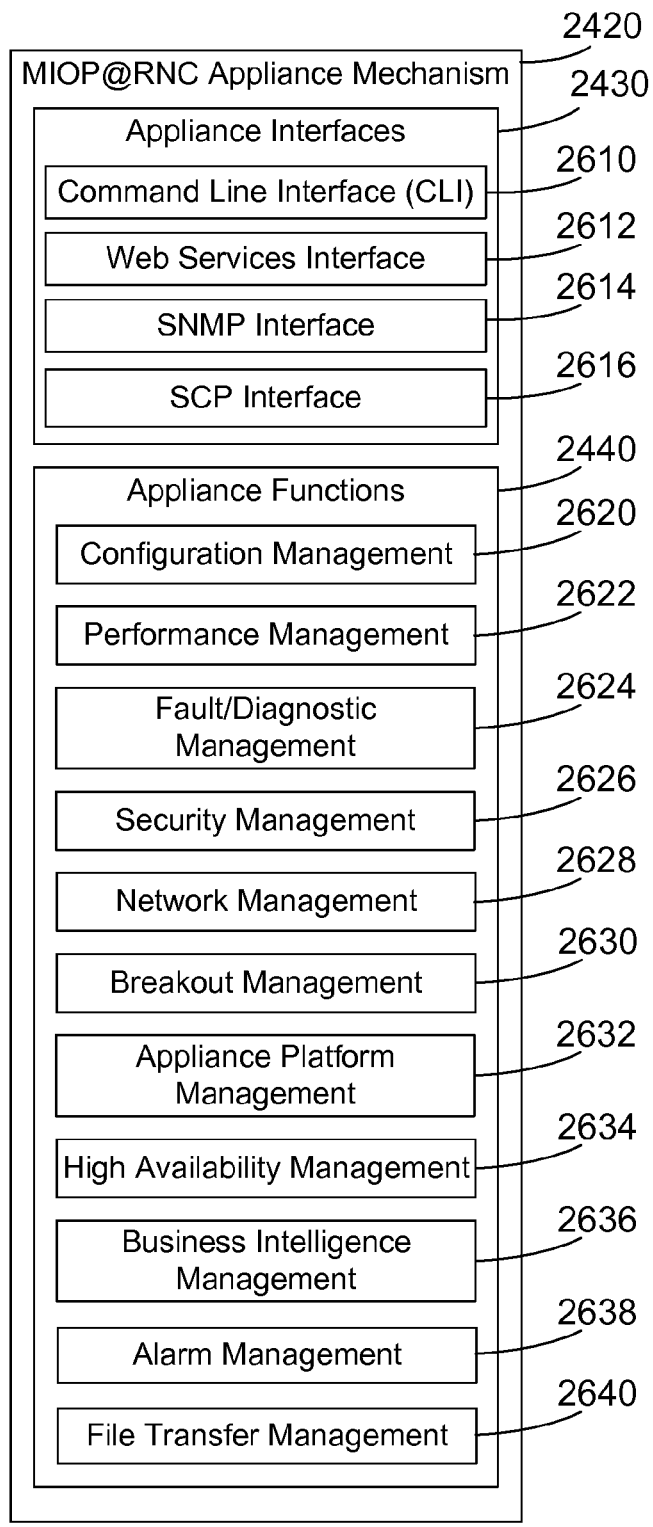
FIG. 26 is a block diagram of one specific implementation of the MIOP@RNC appliance mechanism shown in FIG. 24.

One specific implementation for the MIOP@RNC appliance mechanism 2420 in FIG. 24 is shown in FIG. 26. MIOP@RNC appliance mechanism 2420 includes multiple appliance interfaces 2430 and defined appliance functions 2440. While multiple appliance interfaces are shown in FIG. 26, the disclosure and claims herein also extend to an appliance with a single interface as well. For the specific implementation in FIG. 26, the appliance interfaces include a command line interface (CLI) 2610, a web services interface 2612, a simple network management protocol (SNMP) interface 2614, and a secure copy (SCP) interface 2616. The appliance functions 2440 include configuration management 2620, performance management 2622, fault/diagnostic management 2624, security management 2626, network management 2628, breakout management 2630, appliance platform management 2632, high availability management 2634, business intelligence management 2636, alarm management 2638, and file transfer management 2640. Additional details regarding the appliance interfaces 2430 and appliance functions 2440 are provided below.

The command line interface 2610 is a primary external interface to the MIOP@RNC appliance 2420. In the specific implementation shown in FIG. 26, the command line interface 2610 provides most of the appliance functions 2620-2640, which are described in more detail below. Those commands not provided in command line interface 2610 are provided by the SNMP interface 2614 or the SCP interface 2616, as described in detail below with reference to FIG. 39. The command line interface 2610 may be used by human operators or by other network components coupled to the MIOP@RNC appliance 2420, such as MIOP@NMS 240 shown in FIG. 2.

The web services interface 2612 is another primary external interface to the MIOP@RNC appliance 2420. In the specific implementation shown in FIG. 26, the web services interface 2612 provides all the same functions as the command line interface 2610.

The SNMP interface 2614 is an interface to the MIOP@RNC appliance that is used by an external entity such as MIOP@NMS to receive alarms from MIOP@RNC. For example, if a fan failed on the MIOP@RNC appliance, a "fan failed" SNMP trap could be raised by MIOP@RNC appliance. A monitor running on MIOP@NMS could catch this trap, and any suitable action could be taken in response, including alerting a system administrator of the mobile data network, who could take corrective action, such as dispatching a repair crew to repair the defective fan in the MIOP@RNC appliance. Once the repair is made, the MIOP@NMS would clear the SNMP trap, which would communicate to the MIOP@RNC appliance that the repair was made. In one specific implementation, the SNMP interface includes only the functions for alarm management 2638. The SNMP interface can also be used as a way to request and send information between two network entities, such as MIOP@RNC and MIOP@NodeB, between MIOP@RNC and MIOP@NMS, or between two different MIOP@RNCs. However, the SCP interface 2616 provides a more preferred interface for transferring data between two network entities.

The SCP interface 2616 is an interface based on the Secure Shell (SSH) protocol, such as that typically used in Linux and Unix systems. SCP interface 2616 thus provides a secure way to transfer information between two network entities. The SCP interface 2616 could be used, for example, by MIOP@NMS to transfer configuration information or software updates to MIOP@RNC. The SCP interface 2616 could likewise be used to transfer audit logs, diagnostic information, performance data, or backups of the appliance configuration from MIOP@RNC to MIOP@NMS. Implementing SCP is easy given the SSH already provided on MIOP@RNC that provides a secure shell for the command line interface 2610 to run in. In one specific implementation, the SCP interface 2616 includes only the functions for file transfer management 2640.

Figure 27:
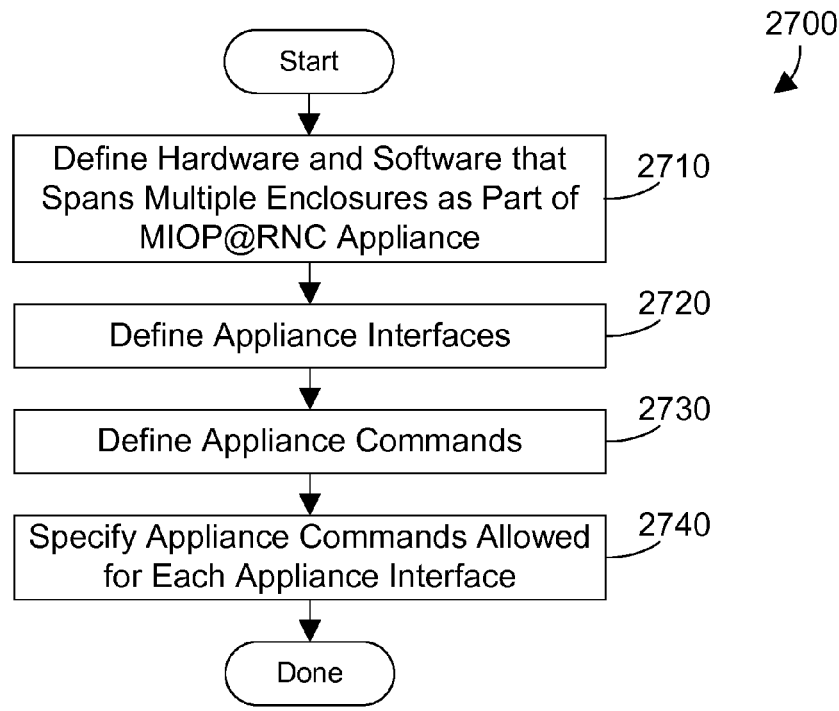
FIG. 27 is a flow diagram of a method for creating a MIOP@RNC appliance.

FIG. 27 shows a method 2700 for defining the appliance interfaces and functions for the MIOP@RNC appliance. First, the hardware and software in different enclosures that will collectively make up the MIOP@RNC appliance are defined (step 2710). The appliance interfaces are defined (step 2720). The appliance commands are defined (step 2730). The appliance commands allowed for each appliance interface are then specified (step 2740). For example, the table in FIG. 39 shows for each set of appliance functions shown in FIG. 26, which of the interfaces implement which commands. While the table in FIG. 39 shows different interfaces for different commands, it is equally possible to have multiple interfaces that implement the same command. Note the MIOP@RNC appliance can include any suitable number of interfaces and any suitable number of commands defined on each of those interfaces.

Figure 28:
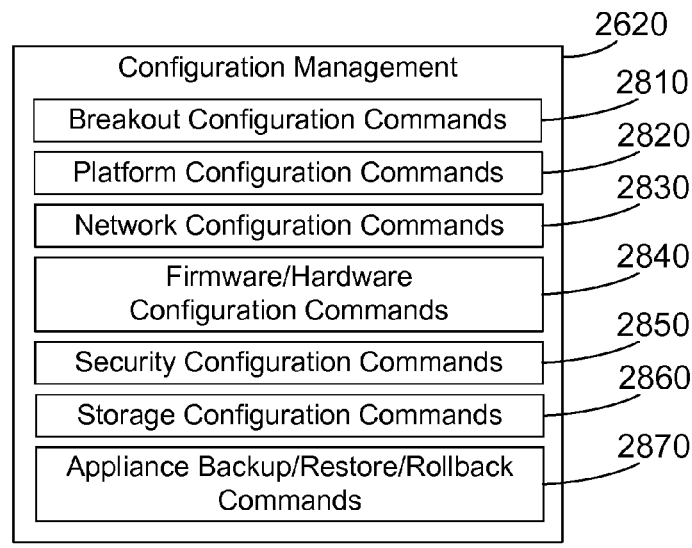
FIG. 28 is a block diagram of one specific implementation for the configuration management 2620 shown in FIG. 26.

The various appliance functions 2440 shown in FIG. 26 may be implemented using different commands. These commands may operate on any suitable portion of the MIOP@NodeB appliance, including portions that are in different enclosures. Examples of some suitable commands are shown in FIGS. 28-38. Referring to FIG. 28, configuration management functions 2620 may include breakout configuration commands 2810, platform configuration commands 2820, network configuration commands 2830, firmware/hardware configuration commands 2840, security configuration commands 2850, storage configuration commands 2860, and appliance backup/restore/rollback commands 2870. The breakout configuration commands 2810 include commands to configure the breakout mechanism in MIOP@RNC. Platform configuration commands 2820 include commands to configure MIOP@RNC. Network configuration commands 2830 include commands to configure network connections in MIOP@RNC. Firmware/hardware configuration commands 2840 include commands to configure the firmware or hardware within MIOP@RNC. Security configuration commands 2850 include commands to configure security settings in MIOP@RNC. Storage configuration commands 2860 are used to configure the storage for MIOP@RNC. Appliance backup/restore/rollback commands 2870 are used to backup the software state of the MIOP@RNC appliance, to restore a previously-stored state, or to roll back to a previous state if a software update proves to be unsuccessful.

Figure 29:
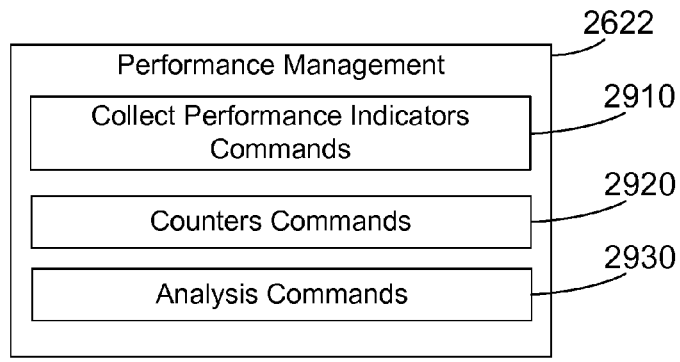
FIG. 29 is a block diagram of one specific implementation for the performance management 2622 shown in FIG. 26.

Referring to FIG. 29, performance management functions 2622 may include collect performance indicators commands 2910, counters commands 2920, and analysis commands 2930. The collect performance indicators commands 2910 include commands that allow collecting key performance indicators (KPIs) from MIOP@RNC. The counters commands 2920 include commands that set or clear counters that measure performance in MIOP@RNC. The analysis commands 2930 include commands that perform analysis of performance parameters within MIOP@RNC. For example, analysis commands 2930 could perform summations of key performance indicators for a given time period. Because a given MIOP@RNC appliance may service hundreds of MIOP@NodeBs, the performance management commands may include statistics related to the MIOP@NodeBs, including bandwidth utilization, peak usage times, etc.

Figure 30:
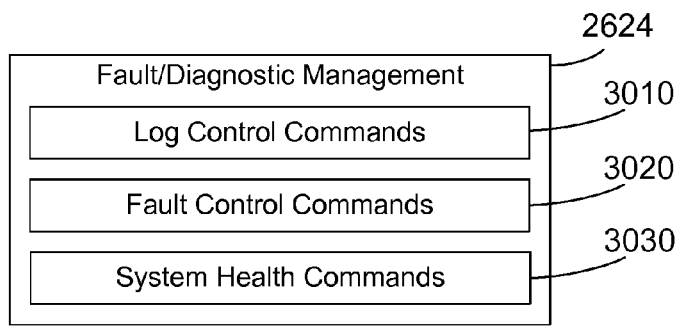
FIG. 30 is a block diagram of one specific implementation for the fault/diagnostic management 2624 shown in FIG. 26.

Referring to FIG. 30, fault/diagnostic management functions 2624 may include log control commands 3010, fault control commands 3020, and system health commands 3030. Log control commands 3010 include commands that collect logs, prune existing logs, purge existing logs, and set logging parameters. Fault control commands 3020 include commands that configure fault targets and view faults that have not been resolved. System health commands 3030 include commands that allowing viewing system health and taking actions in response to faults, such as restarting breakout, shutdown of MIOP@RNC, etc. Note the various commands for the fault/diagnostic management functions 2624 may provide commands at different levels. For example, there may be commands to perform diagnostics on a specific blade. However, the commands could also be at a higher level for a logical entity, such as performing diagnostics for the MIOP@RNC appliance or diagnostics for the management software running on the management blade 2562.

Figure 31:
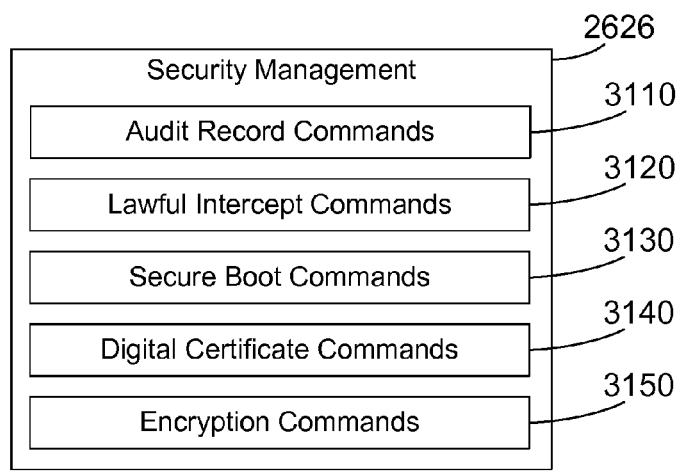
FIG. 31 is a block diagram of one specific implementation for the security management 2626 shown in FIG. 26.

Referring to FIG. 31, security management functions 2626 include audit record commands 3110, lawful intercept commands 3120, secure boot commands 3130, digital certificate commands 3140, and encryption commands 3150. The audit record commands 3110 include commands that allow reviewing and auditing records that track the security functions performed by MIOP@RNC. The lawful intercept commands 3120 include commands to enable or disable lawful intercept for a subscriber and to report status of lawful intercept for a subscriber. The secure boot commands 3130 include commands to set options for securely booting MIOP@RNC. The digital certificate commands 3140 include commands to communicate with a trusted server to sign digital certificates. The encryption commands 3150 include commands that support encryption and decryption of the file system used by MIOP@RNC, or encryption and decryption of files sent to MIOP@NodeB or MIOP@NMS.

Figure 32:
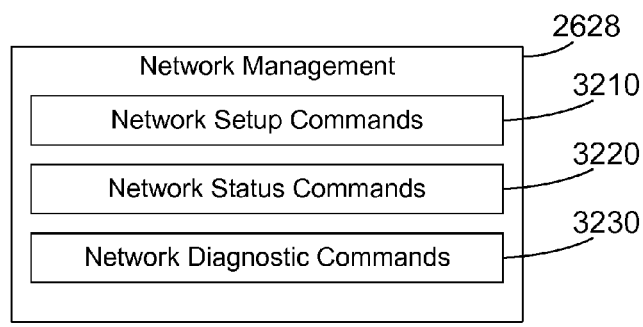
FIG. 32 is a block diagram of one specific implementation for the network management 2628 shown in FIG. 26.

Referring to FIG. 32, the network management commands 2628 include network setup commands 3210, network status commands 3220, and network diagnostic commands 3230. Network setup commands 3210 include commands that setup network connections in MIOP@RNC. There is a significant amount of network setup and configuration that must occur for a MIOP@RNC to be installed into an existing mobile data network, and network setup commands 3220 provide the tools a human operator or software agent needs to configure the network connections. Network status commands 3220 include commands that allow showing network status, statistics, current network configuration, other connected MIOP@RNC systems, connected MIOP@NodeB systems, and routes between the BladeCenter and external switches or routers that are part of MIOP@RNC. Network diagnostic commands 3230 include commands for network diagnostics and tests, such as pinging an interface to see if it responds. Note the configuration management functions 2620 shown in FIG. 28 also include network configuration commands, which can be used to configure network connections in MIOP@RNC both during manufacturing as well as when the MIOP@RNC is configured and made operational in a mobile data network.

Figure 33:
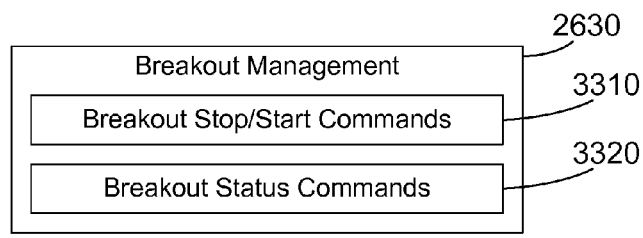
FIG. 33 is a block diagram of one specific implementation for the breakout management 2630 shown in FIG. 26.

Referring to FIG. 33, the breakout management functions 3310 may include breakout stop/start commands 3310 and breakout status commands 3320. The breakout stop/start commands 3310 include commands to stop and start breakout in either MIOP@NodeB or in MIOP@RNC. The breakout status commands 3320 include commands to determine the state of breakout on MIOP@RNC and on all MIOP@NodeBs served by the MIOP@RNC.

Figure 34:
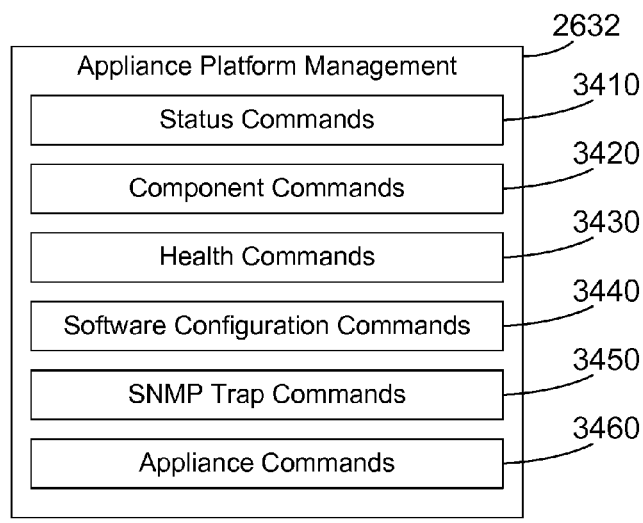
FIG. 34 is a block diagram of one specific implementation for the appliance platform management 2632 shown in FIG. 26.

Referring to FIG. 34, the appliance platform management functions 2632 may include status commands 3410, component commands 3420, health commands 3430, software configuration commands 3440, SNMP trap commands 3450, and appliance commands 3460. The status commands 3410 may include commands that show the health status and overload status of MIOP@RNC. The component commands 3420 include commands that list components within MIOP@RNC and their versions. The health commands 3430 include commands that monitor the health of MIOP@RNC, such as commands that respond to health and overload issues. The software configuration commands 3440 include commands to upgrade or rollback software running on MIOP@RNC. The SNMP trap commands 3450 include commands to set SNMP trap destinations and define SNMP trap actions. The appliance commands 3460 include commands to reboot MIOP@RNC, put MIOP@RNC to sleep for some period of time, and reset MIOP@RNC to its manufacturing defaults. Because the MIOP@RNC is such a critical component in the mobile data network, shutting down or rebooting the MIOP@RNC appliance abruptly could create problems. Thus, one appliance command could be to take the system down, which would cause the MIOP@RNC to gracefully shut down. This graceful shutdown would be a relatively complex set of actions, such as updating network routes to bypass the MIOP@RNC, instructing all MIOP@NodeBs to shut down because they cannot operate without a MIOP@RNC, ensuring all active sessions are gracefully ended, and shutting down the MIOP@RNC hardware. In similar fashion, the platform provides commands for gracefully adding the MIOP@RNC to an existing mobile data network to bring up and configure different systems that enable MIOP@RNC to function properly.

Figure 35:
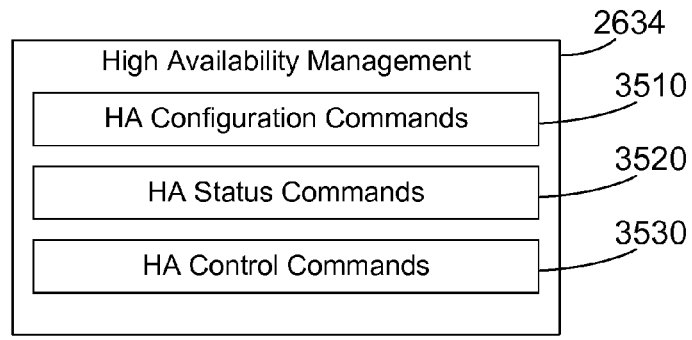
FIG. 35 is a block diagram of one specific implementation for the high availability management 2634 shown in FIG. 26.

Referring to FIG. 35, the high availability management functions 2634 include HA configuration commands 3510, HA status commands 3520, and HA control commands 3530. The HA configuration commands 3510 include commands that allow configuring the features of MIOP@RNC that support high availability (HA). Because MIOP@RNC potentially services hundreds of MIOP@NodeBs, the MIOP@RNC implementation must be very robust and highly available. The HA status commands 3520 include commands that show status of the various components in MIOP@RNC, such as the status of active/standby blade pairs. The HA control commands 3530 include commands that allow controlling components within MIOP@RNC, such as performing a manual fail-over to a standby blade. Because MIOP@RNC needs to have high availability for all of its components, the HA management functions 2634 may apply to any of the MIOP@RNC components, even those in different enclosures external to the BladeCenter.

Figure 36:
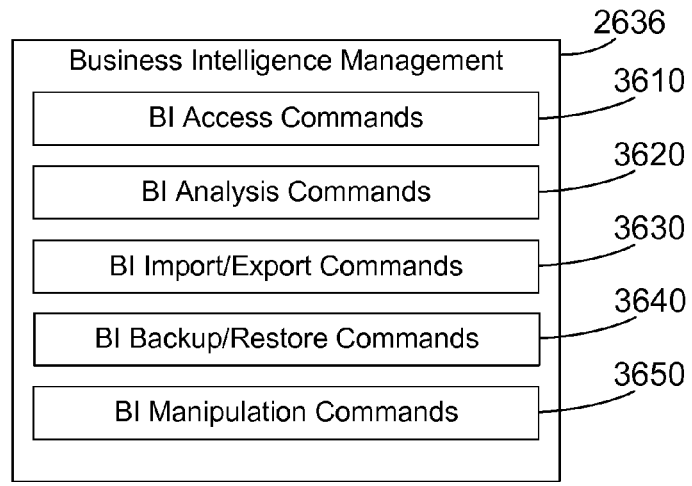
FIG. 36 is a block diagram of one specific implementation for the business intelligence management 2636 shown in FIG. 26.

Referring to FIG. 36, the business intelligence (BI) management functions include BI access commands 3610, BI analysis commands 3620, BI import/export commands 3630, BI backup/restore commands 3640, and BI manipulation commands 3650. The BI access commands 3610 include commands that allow accessing the business intelligence in MIOP@RNC. The BI analysis commands 3620 include commands that perform analytics on the business intelligence in MIOP@RNC. The BI import/export commands 3630 include commands that import business intelligence into MIOP@RNC, and that export business intelligence out of MIOP@RNC. The BI backup/restore commands 3640 include commands that backup and restore the business data in the MIOP@RNC. The BI manipulation commands 3650 include commands that allow manipulating the business intelligence, such as data pruning and compaction. The business logic in MIOP@RNC is preferably persisted in a database, such as storage 2580 shown in FIG. 25.

Figure 37:
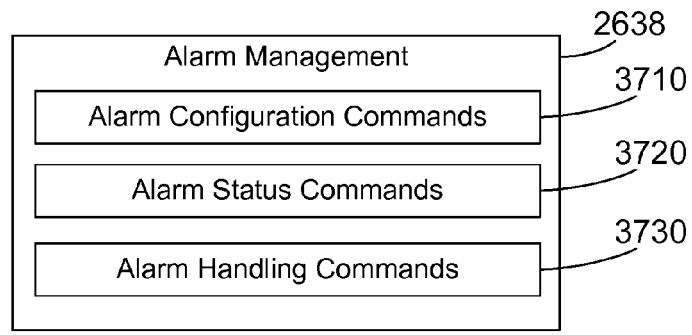
FIG. 37 is a block diagram of one specific implementation for the alarm management 2638 shown in FIG. 26.

Referring to FIG. 37, the alarm management functions 2638 include alarm configuration commands 3710, alarm status commands 3720 and alarm handling commands 3730. The alarm configuration commands 3710 include commands to configure alarms in MIOP@RNC. The alarm status commands 3720 include commands to determine the status of alarms in MIOP@RNC or to clear previously raised alarms on MIOP@RNC. In one particular implementation, the alarm management functions 2638 are available via the SNMP interface 2614. In this configuration, SNMP is used by MIOP@RNC to raise alarms that are being monitored. For example, if a fan failed on the charging blade 2566 shown in FIG. 25, a "fan failed" SNMP trap could be raised by the MIOP@RNC. This trap would be caught by a monitor running on MIOP@NMS, and an alert would be given to a system administrator monitoring the mobile data network. The system administrator could then take corrective action, such as dispatching a repair crew to repair the failed fan. Once the failure is fixed, the system administrator can clear the alarm by sending a clear SNMP trap to MIOP@RNC. Note also that the appliance wrapper allows changing the form of SNMP traps. Thus, the failure of a cooling fan on charging blade 2566 might raise a trap that indicated "Fan #2 on Blade #5 failed." However, this detailed information is not passed on by MIOP@RNC, because this would reveal the details of the underlying hardware in MIOP@RNC. Instead, the SNMP trap is received by MIOP@RNC, and is changed to a SNMP trap that is visible to external equipment that does not show the specifics of the underlying hardware in MIOP@RNC. Thus, the trap raised by MIOP@RNC to external components could indicate "fan on charging blade" failed without revealing the detailed hardware configuration in MIOP@RNC.

Referring to FIG. 38, the file transfer management functions 2640 include file transfer commands 3810 that allow transferring files to and from MIOP@RNC. In one particular implementation, the file transfer commands 3810 are available via the SCP interface 2616. The file transfer commands 3810 include commands in a Secure Shell (SSH), which is a network protocol used to remote shell access to the MIOP@RNC appliance. SSH is very commonly used for secure shell access on Linux and Unix systems. Secure Copy (SCP) runs in SSH and allows securely copying files between systems. The SCP interface 2616 thus provides file transfer commands 3810 that allow transferring files to and from MIOP@RNC. For example, configuration files or software updates could be transferred to MIOP@RNC, while audit logs, diagnostic information, performance data, and backups of the appliance configuration could be transferred from MIOP@RNC.

FIG. 39 shows how commands may be defined for interfaces in one specific example. The command line interface implements all configuration management commands except for file transfer commands, which are implemented in the SCP interface. The command line interface implements all performance management commands except for file transfer commands, which are implemented in the SCP interface. The command line interface implements all fault/diagnostic management commands except for alarm traps, which are implemented in the SNMP interface, and file transfer commands, which are implemented in the SCP interface. The command line interface implements all security management commands except for file transfer commands, which are implemented in the SCP interface. The command line interface implements all network management commands and all breakout management commands. The command line interface implements all appliance platform management commands except for file transfer commands, which are implemented in the SCP interface. The command line interface implements all high availability management commands except for file transfer commands, which are implemented in the SCP interface. The command line interface implements all business intelligence management commands except for file transfer commands, which are implemented in the SCP interface. The SNMP interface implements all alarm management commands. The SCP interface implements all file transfer management commands. Of course, FIG. 39 is one suitable example of specifying which appliance commands are implemented in different interfaces. The disclosure and claims herein expressly extend to defining any suitable number of commands on any suitable number of interfaces, including commands implemented in multiple interfaces.

The mobile data network 200 disclosed herein includes MIOP components that provide a variety of different services that are not possible in prior art mobile data network 100. In the most preferred implementation, the MIOP components do not affect voice traffic in the mobile data network. In addition to performing optimizations that will enhance performance in the form of improved download speeds, lower latency for access, or improved quality of experience in viewing multimedia on the mobile data network, the MIOP architecture also provides additional capabilities that may produce new revenue-generating activities for the carrier. For example, analytics may be performed on subscriber sessions that allow targeting specific subscribers with additional services from the carrier to generate additional revenue. For example, subscribers congregating for a live music event may be sent promotions on paid for media related to that event. In another example, subscribers getting off a train may be sent a coupon promoting a particular shuttle company as they walk up the platform towards the street curb. Also, premium web content in the form of video or other multimedia may be served from local storage and the subscriber would pay for the additional content and quality of service.

While the mobile data network in FIG. 2 and discussed herein is in the context of a 3G mobile data network, the disclosure and claims herein expressly extend to other networks as well, including Long Term Evolution (LTE) networks, flat RAN networks, and code division multiple access (CDMA) networks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

The disclosure and claims are directed to a mobile data network that includes an appliance that performs one or more mobile data services in the mobile data network. The appliance is defined to include hardware in multiple enclosures. The appliance has defined interfaces and defined commands on each interface that allow performing all needed functions on the appliance without revealing details regarding the hardware and software used to implement the appliance. This appliance architecture allows performing new mobile network services in a mobile data network within the infrastructure of an existing mobile data network.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An appliance deployed in a mobile data network that includes a plurality of basestations, each basestation communicating with a corresponding antenna that transmits and receives radio signals to and from user equipment, wherein the plurality of basestations are part of a radio access network that communicates with a core network in the mobile data network, the appliance comprising:
   a plurality of enclosures coupled to each other to allow communication between the plurality of enclosures, the plurality of enclosures comprising:
      a first enclosure enclosing first hardware and first software;
      a second enclosure separate from the first enclosure and not encompassed within the first enclosure and not encompassing the first enclosure, the second enclosure enclosing second hardware and second software;
   an appliance mechanism residing in a memory in the second hardware in the second enclosure and executed by at least one processor in the second hardware, the appliance mechanism logically grouping together the first hardware, the first software, the second hardware, and the second software so the first hardware, the first software, the second hardware, and the second software are treated as one logical entity by components in the mobile data network external to the appliance, wherein the appliance mechanism comprises:
      an appliance interface for the components in the mobile data network external to the appliance to interact with the appliance, wherein the appliance interface hides details of the first and second hardware and the first and second software in the first and second enclosures, and all communication from the components in the mobile data network external to the appliance occurs via the appliance interface; and
      a plurality of commands for the appliance interface that allow performing all needed functions on the appliance without revealing details regarding the first and second hardware and the first and second software used to implement the appliance, wherein the plurality of commands comprises configuration management commands for managing configuration of the appliance.

2. The appliance of claim 1 wherein the plurality of enclosures comprises a plurality of computer servers in a rack.

3. The appliance of claim 2 wherein the plurality of enclosures further comprises an enclosure for a computer storage system external to the rack.

4. The appliance of claim 3 wherein the plurality of enclosures further comprises an enclosure for at least one network component external to the rack.

5. The appliance of claim 1 wherein the plurality of commands further comprises:
   performance management commands for managing performance of the appliance; and
   fault/diagnostic management commands for managing faults and performing diagnostics in the appliance.

6. The appliance of claim 1 wherein the plurality of commands further comprises:
   security management commands that manage security of the appliance; and
   network management commands for setting up network connections in the appliance.

7. The appliance of claim 1 wherein the plurality of commands further comprises:
   breakout management commands for managing a breakout function of the appliance; and
   appliance platform management commands for managing configuration and health of the appliance.

8. The appliance of claim 1 wherein the plurality of commands further comprises:
   high availability management commands for assuring high availability of the appliance; and
   business intelligence management commands for accessing and analyzing business intelligence in the appliance.

9. The appliance of claim 1 wherein the plurality of commands further comprises alarm management commands for monitoring and controlling alarms in the appliance.

10. The appliance of claim 1 wherein the plurality of commands further comprises file transfer management commands for transferring files to and from the appliance.

11. The appliance of claim 1 wherein the plurality of commands hides details of the hardware in the appliance.

12. An appliance deployed in a mobile data network that includes a plurality of basestations, each basestation communicating with a corresponding antenna that transmits and receives radio signals to and from user equipment, wherein the plurality of basestations are part of a radio access network that communicates with a core network in the mobile data network, the appliance comprising:
   a plurality of enclosures coupled to each other via network connections, wherein the plurality of enclosures comprises a plurality of computer servers in a rack, a computer storage system external to the rack, and at least one network component external to the rack, each enclosure including hardware, a first of the plurality of enclosures including first software, the first software comprising:
      an interface for equipment external to the appliance to interact with the appliance, wherein the interface hides details of the hardware in the plurality of enclosures; and
      a plurality of commands for the interface, wherein the plurality of commands comprises:
         configuration management commands for managing configuration of the appliance;
         performance management commands for managing performance of the appliance;
         fault/diagnostic management commands for managing faults and performing diagnostics in the appliance;
         security management commands that manage security of the appliance;
         network management commands for setting up network connections in the appliance;
         breakout management commands for managing a breakout function of the appliance;
         appliance platform management commands for managing configuration and health of the appliance;
         high availability management commands for assuring high availability of the appliance;
         business intelligence management commands for accessing and analyzing business intelligence in the appliance;
         alarm management commands for monitoring and controlling alarms in the appliance; and
         file transfer management commands for transferring files to and from the appliance.

13. An appliance deployed in a mobile data network that includes a plurality of basestations, each basestation communicating with a corresponding antenna that transmits and receives radio signals to and from user equipment, wherein the plurality of basestations are part of a radio access network that communicates with a core network in the mobile data network, the appliance comprising:
- a computer storage system enclosed within a first enclosure;
- at least one network component enclosed within a second enclosure external to the first enclosure;
- a plurality of computer servers enclosed within a third enclosure comprising a rack external to the first enclosure and external to the second enclosure, one of the plurality of computer servers in the rack including an appliance mechanism that logically groups together the computer storage system, the at least one network component, and the plurality of computer servers so the computer storage system, the at least one network component, and the plurality of computer servers are treated as one logical entity by components in the mobile data network external to the appliance, wherein the appliance mechanism comprises:
  - an appliance interface for equipment external to the appliance to interact with the appliance, wherein the appliance interface hides details of hardware and software in the first enclosure, the second enclosure, and the third enclosure, and all communication from the components in the mobile data network external to the appliance occurs via the appliance interface; and
  - a plurality of commands for the appliance interface, wherein the plurality of commands comprises configuration management commands for managing configuration of the appliance.

* * * * *